US012127674B2

(12) United States Patent
Albers et al.

(10) Patent No.: US 12,127,674 B2
(45) Date of Patent: Oct. 29, 2024

(54) MODULAR DECKING SYSTEM WITH SECUREMENT BEAMS

(71) Applicant: Innovative Logistics, LLC, Fort Smith, AR (US)

(72) Inventors: David George Albers, Fort Smith, AR (US); Dylan Henderson, Fort Smith, AR (US); Brandon Loukota, Fort Smith, AR (US); Brock Allen McAllister, Fort Smith, AR (US); Kenneth Lee Noblitt, Fort Smith, AR (US); Mark Carl Belin, Fort Smith, AR (US)

(73) Assignee: INNOVATIVE LOGISTICS, LLC, Fort Smith, AR (US)

( * ) Notice: Subject to any disclaimer, the term of this patent is extended or adjusted under 35 U.S.C. 154(b) by 0 days.

(21) Appl. No.: 18/387,557

(22) Filed: Nov. 7, 2023

(65) Prior Publication Data
US 2024/0065440 A1    Feb. 29, 2024

Related U.S. Application Data

(62) Division of application No. 17/870,547, filed on Jul. 21, 2022.

(Continued)

(51) Int. Cl.
*A47B 96/14*    (2006.01)
*A47B 96/07*    (2006.01)

(52) U.S. Cl.
CPC .......... *A47B 96/1441* (2013.01); *A47B 96/07* (2013.01); *A47B 2220/0036* (2013.01); *A47B 2220/0061* (2013.01)

(58) Field of Classification Search
CPC ...... B60P 7/15; B60P 1/00; B60P 1/02; A47B 96/07; A47B 96/1441; A47B 2200/0036; A47B 2200/0061
See application file for complete search history.

(56) References Cited

U.S. PATENT DOCUMENTS 5,338,137 A * 8/1994 Jensen ................. B61D 45/001
                                                                 211/187
6,062,780 A * 5/2000 Petelka ..................... B60P 7/15
                                                                 410/150

(Continued)

FOREIGN PATENT DOCUMENTS

DE    102017006537 A1    1/2018
KR      10-1592817 B1    2/2016

OTHER PUBLICATIONS

Final Rejection dated Nov. 30, 2023, from U.S. Appl. No. 17/870,547, 17 sheets.

(Continued)

*Primary Examiner* — Patrick D Hawn
(74) *Attorney, Agent, or Firm* — KATTEN MUCHIN ROSENMAN LLP

(57) ABSTRACT

The ends of the adjustable shoring beam can be adjusted to different heights along one or more securement tracks on a vertical post. The adjustable shoring beam engages the securement tracks on the vertical posts and each end is independently adjustable in one degree of freedom. Modular deck tracks on the vertical posts, adjacent to the securement tracks, allow for the engagement of a modular deck with a vertical post. The modular deck and securement beam are able to be moved independently past each other on the vertical posts by a user or an autonomous machine.

3 Claims, 29 Drawing Sheets

Related U.S. Application Data

(60) Provisional application No. 63/224,296, filed on Jul. 21, 2021.

(56) References Cited

U.S. PATENT DOCUMENTS

| | | | |
|---|---|---|---|
| 6,074,143 A | 6/2000 | Langston et al. | |
| 6,203,234 B1 | 3/2001 | Olson | |
| 6,722,829 B2 | 4/2004 | Williams | |
| 6,739,811 B1 | 5/2004 | Petelka | |
| 6,824,341 B2 | 11/2004 | Ehrlich | |
| 7,037,055 B1 | 5/2006 | Rogers | |
| 7,249,624 B2 | 7/2007 | Zeh | |
| 7,337,730 B2 * | 3/2008 | Bienick | F25D 25/02 108/108 |
| 8,172,494 B1 | 5/2012 | Knox | |
| 8,740,526 B2 | 6/2014 | Knox | |
| 8,757,944 B2 | 6/2014 | Calico | |
| 8,757,947 B2 | 6/2014 | Knox | |
| 8,820,008 B2 | 9/2014 | Knox | |
| 8,979,451 B2 | 3/2015 | Downing | |
| 9,090,192 B2 | 7/2015 | Squyres | |
| 9,393,896 B1 | 7/2016 | Squyres | |
| 9,505,337 B1 * | 11/2016 | Squyres | B61D 45/002 |
| 9,566,895 B2 | 2/2017 | Knox | |
| 10,794,412 B2 | 10/2020 | Shangle | |
| 11,110,851 B2 | 9/2021 | Squyres | |
| 11,208,028 B2 * | 12/2021 | da Rosa | B61D 45/001 |
| 11,345,273 B2 | 5/2022 | Knox | |
| 2004/0144058 A1 | 7/2004 | Zeh et al. | |
| 2007/0266655 A1 | 11/2007 | Howe et al. | |
| 2009/0007520 A1 | 1/2009 | Navon | |
| 2018/0050630 A1 * | 2/2018 | Kauffman | B65D 90/0053 |
| 2021/0380033 A1 | 12/2021 | Knox | |
| 2023/0027401 A1 | 1/2023 | Albers | |

OTHER PUBLICATIONS

International Search Report and Written Opinion mailed Nov. 3, 2022, from PCT/US2022/037890, 10 sheets.

Non-Final Rejection dated Jun. 20, 2023, from U.S. Appl. No. 17/870,547, 27 sheets.

* cited by examiner

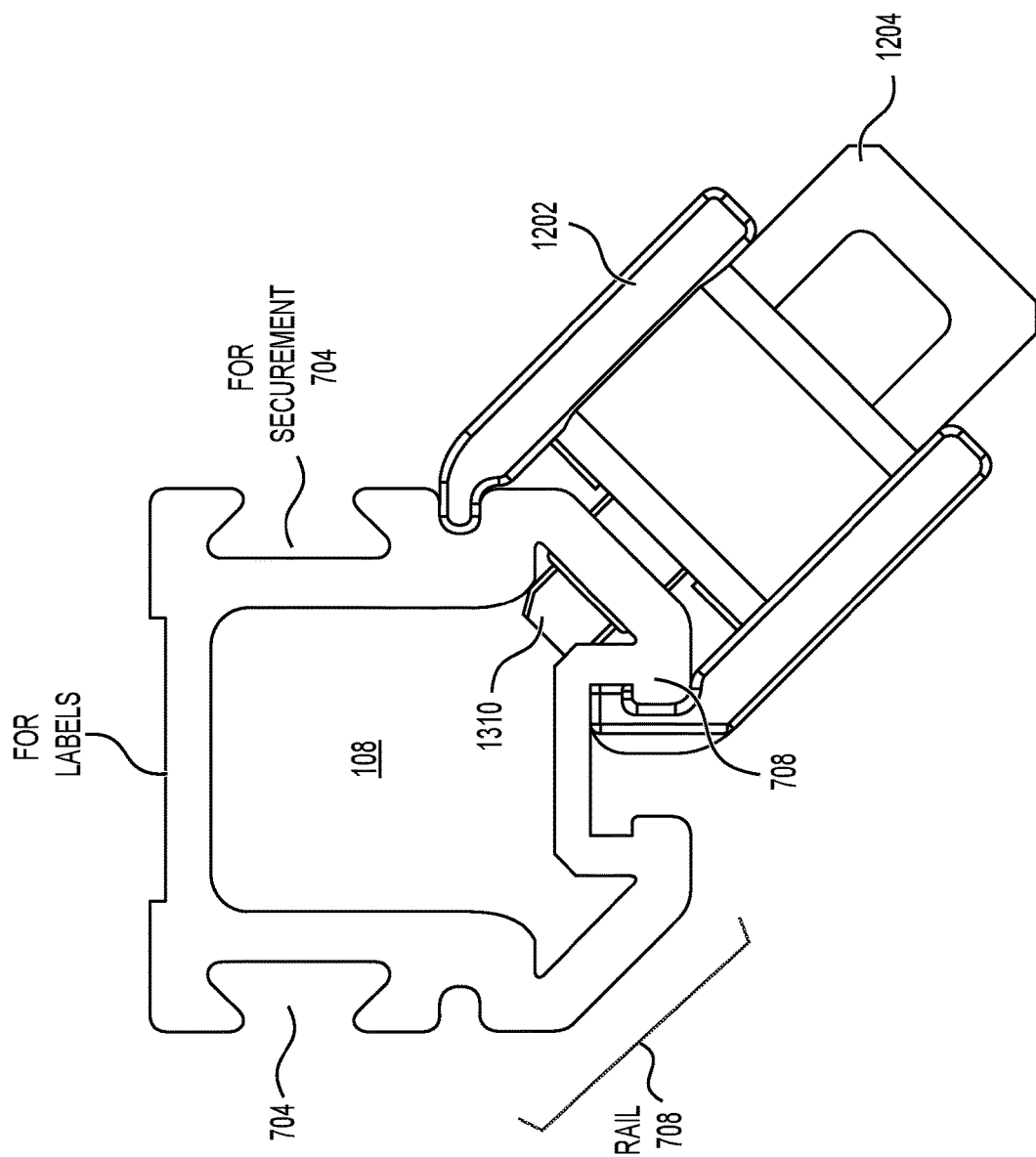

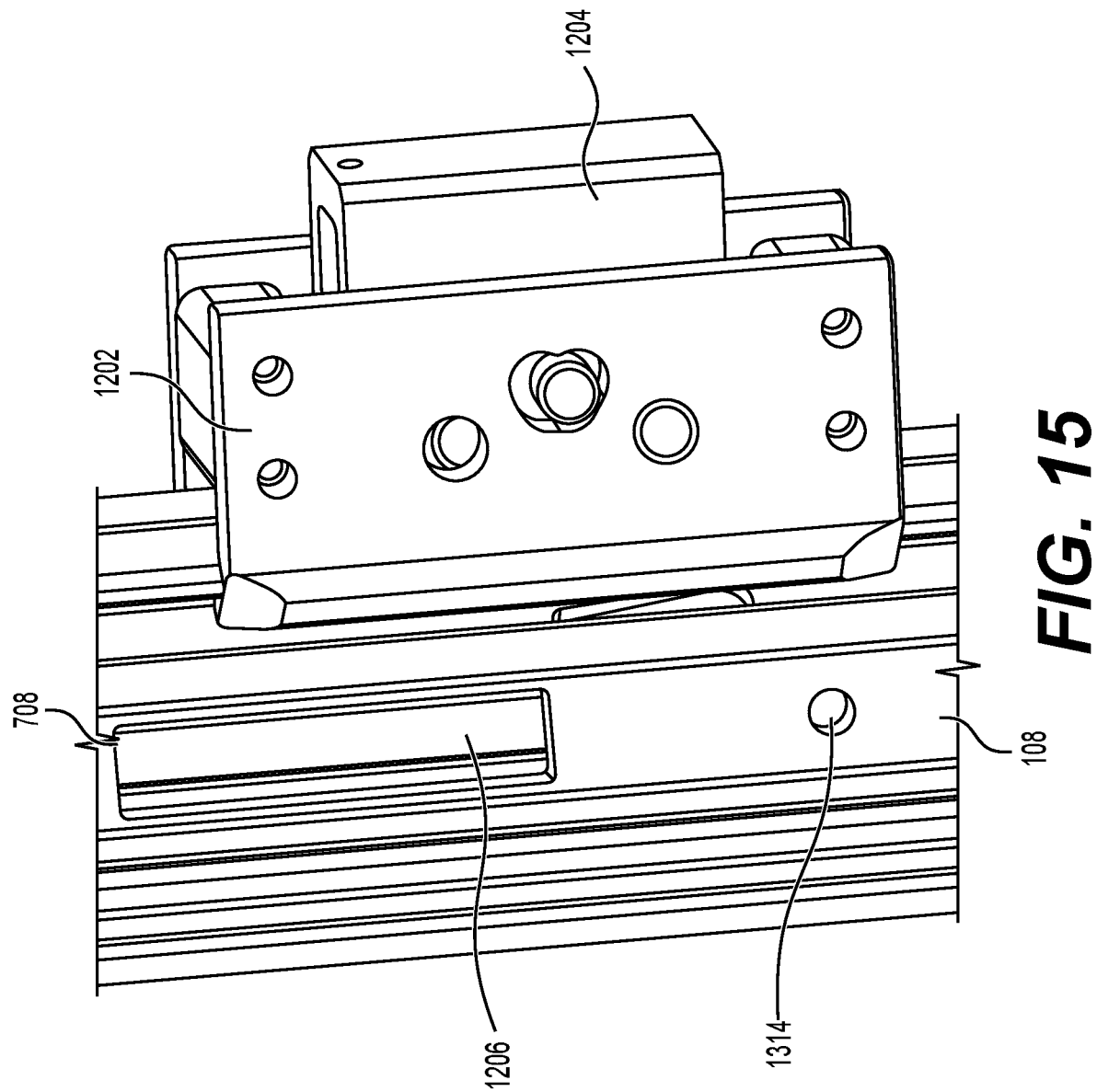

MODULAR DECKING SYSTEM WITH SECUREMENT BEAMS

CROSS-REFERENCE TO RELATED APPLICATIONS

This application is a divisional of U.S. patent application Ser. No. 17/870,547, filed Jul. 21, 2022, which claims priority to U.S. Provisional Application Ser. No. 63/224,296, filed Jul. 21, 2021, the entire contents of which are hereby incorporated by reference in their entirety.

FIELD OF THE INVENTION

The present invention is directed to a modular decking system having height adjustable modular decks coupled to vertical posts on a movable platform (MP). The vertical posts also accommodate one or more adjustable securement beams for restricting the movement of freight on the MP.

BACKGROUND

Current decking systems are not conducive to automation. It is hard to adjust decking because there is no restriction to the movement in the x-y-z planes, making it difficult for a robot to reposition a deck consistently. Locking and unlocking the deck also requires the user to manually lock and unlock decking so that it can be moved, presenting a hazard to a user, especially in an automated environment.

Removable beams have also been used in combination with decking to help restrict movement of freight on MPs. However, current removable beams and straps must be accumulated and stored during unsecurement and can be lost. They must also be picked up and precisely positioned using robots. Placing securement beams with six degrees of freedoms makes placing of the securement beams a complicated task, requiring separate location of both ends relative to the MP with small tolerances for placement.

Therefore, a need clearly exists for a modular decking system more conducive to automation. The modular decks are modified by securing their corners to tracks in the vertical posts to only allow for upward and downward movement of the modular decks. This greatly increases the ability of a robot to adjust the height. Further, the ends of securement beams are coupled to adjacent tracks in the vertical posts, thereby also allowing easy adjustment of the securement beams.

SUMMARY

The present invention discloses an adjustable shoring beam in which the ends can adjusted to different heights along one or more securement tracks on a vertical post. The adjustable shoring beam engages the securement tracks on the vertical posts and each end is independently adjustable in one degree of freedom. Modular deck tracks on the vertical posts, adjacent to the securement tracks, allow for the engagement of a modular deck with a vertical post. The modular deck and securement beam are able to be moved independently past each other on the vertical posts by a user or an autonomous machine.

BRIEF DESCRIPTION OF THE DRAWINGS

FIG. 14 depicts a cross-section view showing the coupling between the carriage assembly and the vertical post.

FIG. 15 depicts another perspective view of the carriage assembly.

DETAILED DESCRIPTION

Figure 1:
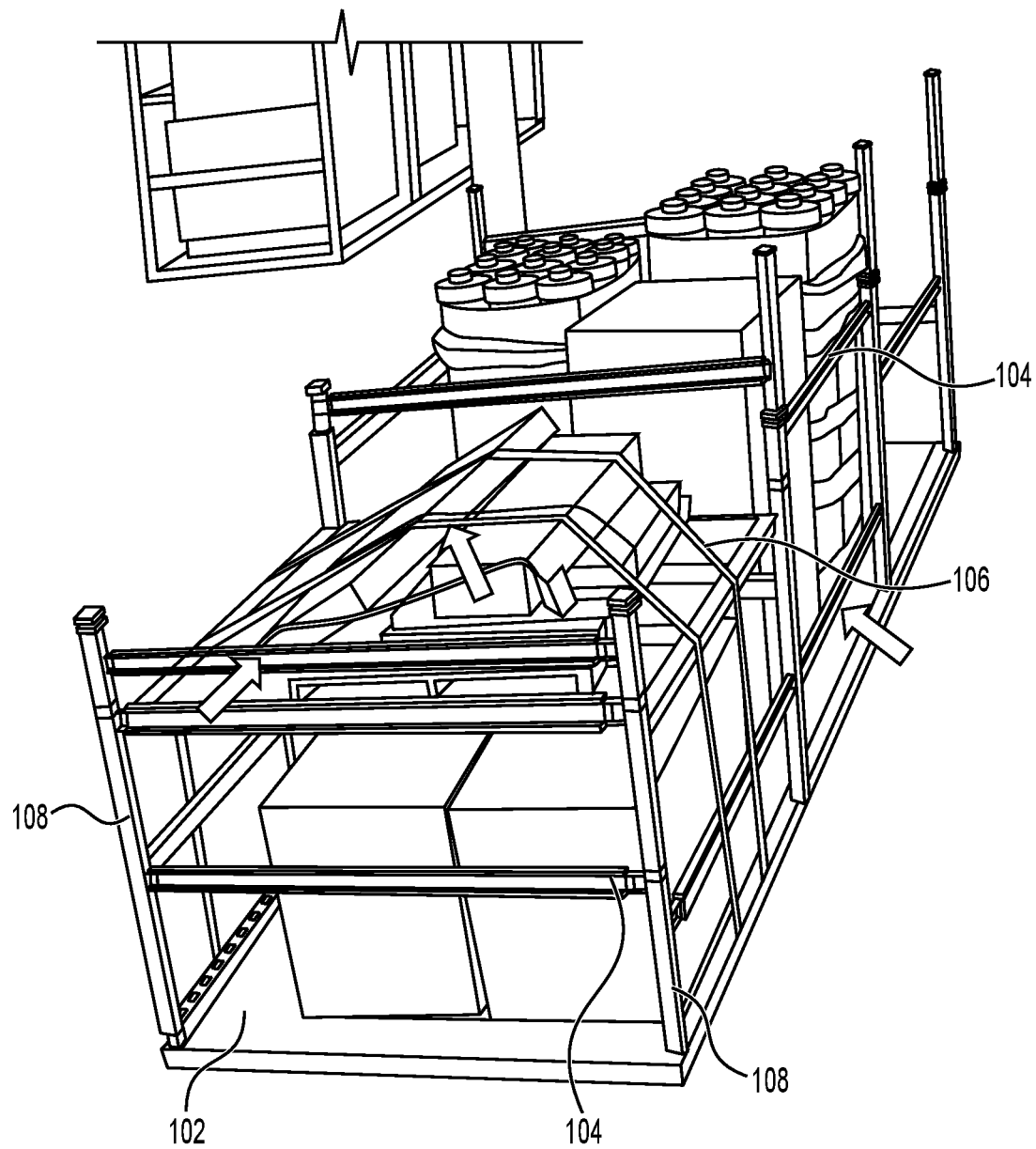
FIG. 1 depicts a prior art view of securement beams and straps coupled to an MP.

Referring first to FIG. 1, depicted is an MP 102 using adjustable securement beams 104 and straps 106. While relatively easy for a human to install, securement beams 104 and straps 106 are difficult for any automated system to install because each end must be independently secured to MP 102 or vertical posts 108. Performing automated tasks is especially difficult when there are six degrees of freedom because the system must account for changes in all directions instead of just the direction of adjustment. Further, when the securement beams 104 and straps 106 are not in use, they must be stored in another location and kept track of.

Figure 2:
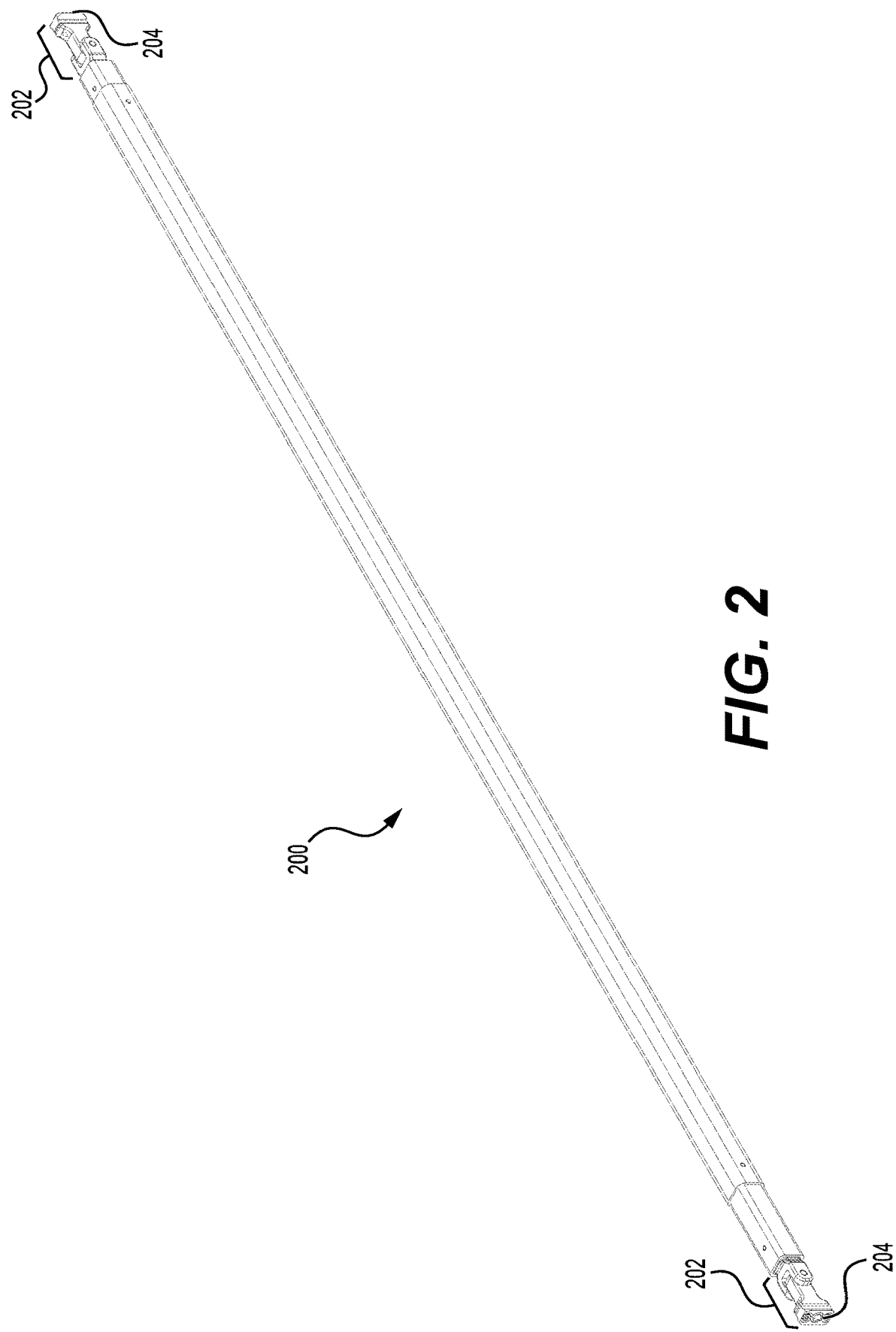
FIG. 2 depicts a view of a securement beam shown in isolation according to an embodiment of the present invention.
Figure 3:
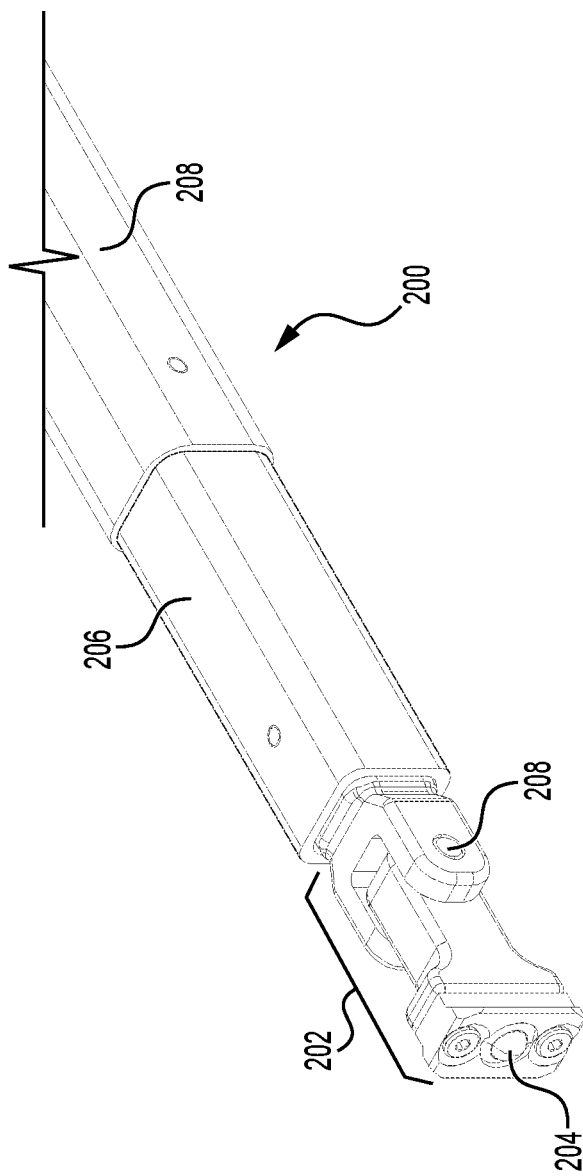
FIG. 3 depicts a first end of the securement beam.

FIG. 2 depicts a securement beam 200 according to an embodiment of the present invention. Each end of the securement beam 200 terminates in a low friction block 202 which is sized to slide within a rail of the vertical post 108 as will be described later. Each low friction block 202 includes a locking mechanism 204 which engages with an opening in the vertical post for fixing each end of securement beam 200 at spaced vertical locations. In a preferred embodiment, the locking mechanism 204 is a ball detent system which is biased by a spring internal to low friction block 202 as shown in FIG. 3. The low friction block 202 is coupled to sliding beam 206 via pivot joint 208. Pivot joint 208 allows the ends of securement beam 200 to be placed at different heights along the vertical post.

Figure 4:
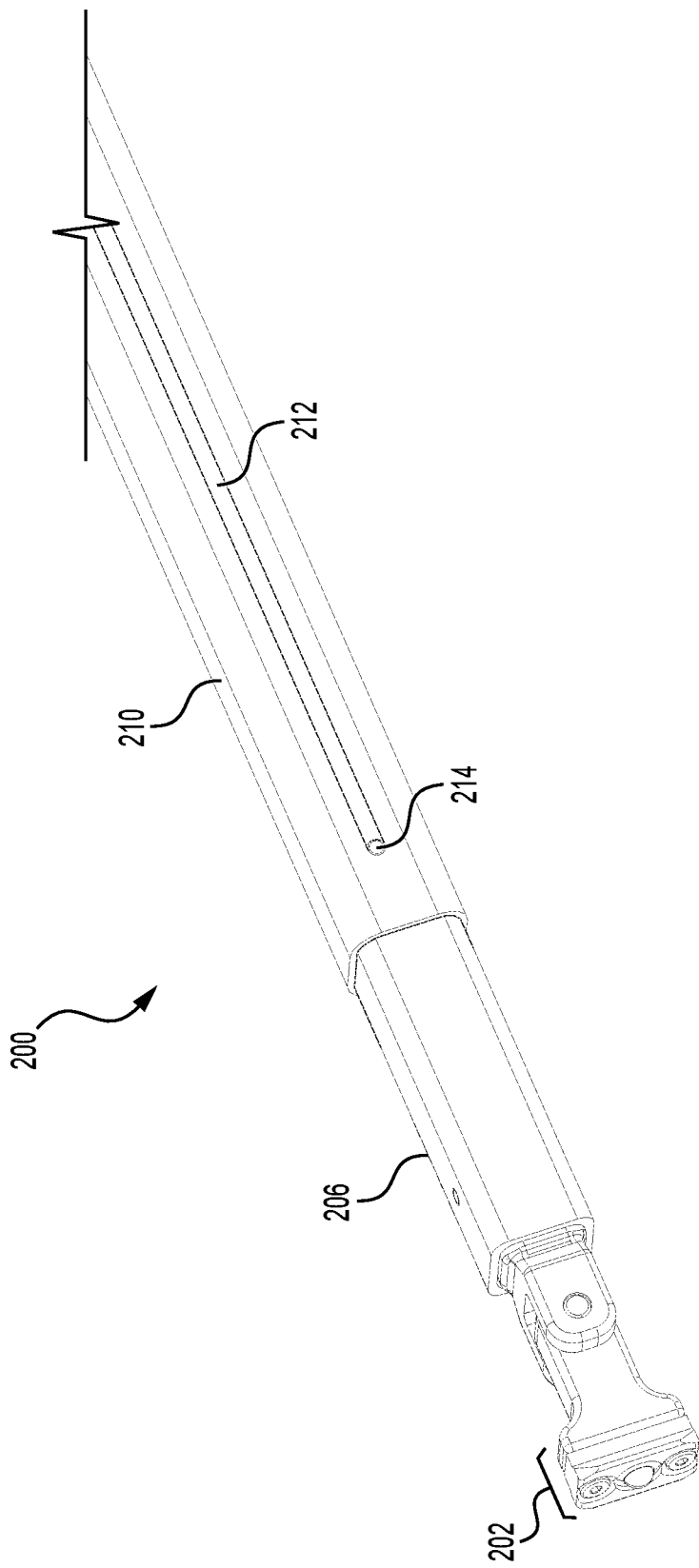
FIG. 4 depicts a view of the securement beam with the central beam shown in phantom.

FIG. 4 depicts how each sliding beam 206 is slidably engaged with central beam 210. Each sliding beam 206 preferably comprises longitudinal groove 212 on opposing sides. A pin 214 is inserted through central beam 210 to prevent accidental separation of central beam 210 and sliding beam 206. Further, the length of longitudinal groove 212 limits the relative movement between central beam 210 and sliding beam 206.

Figure 5:
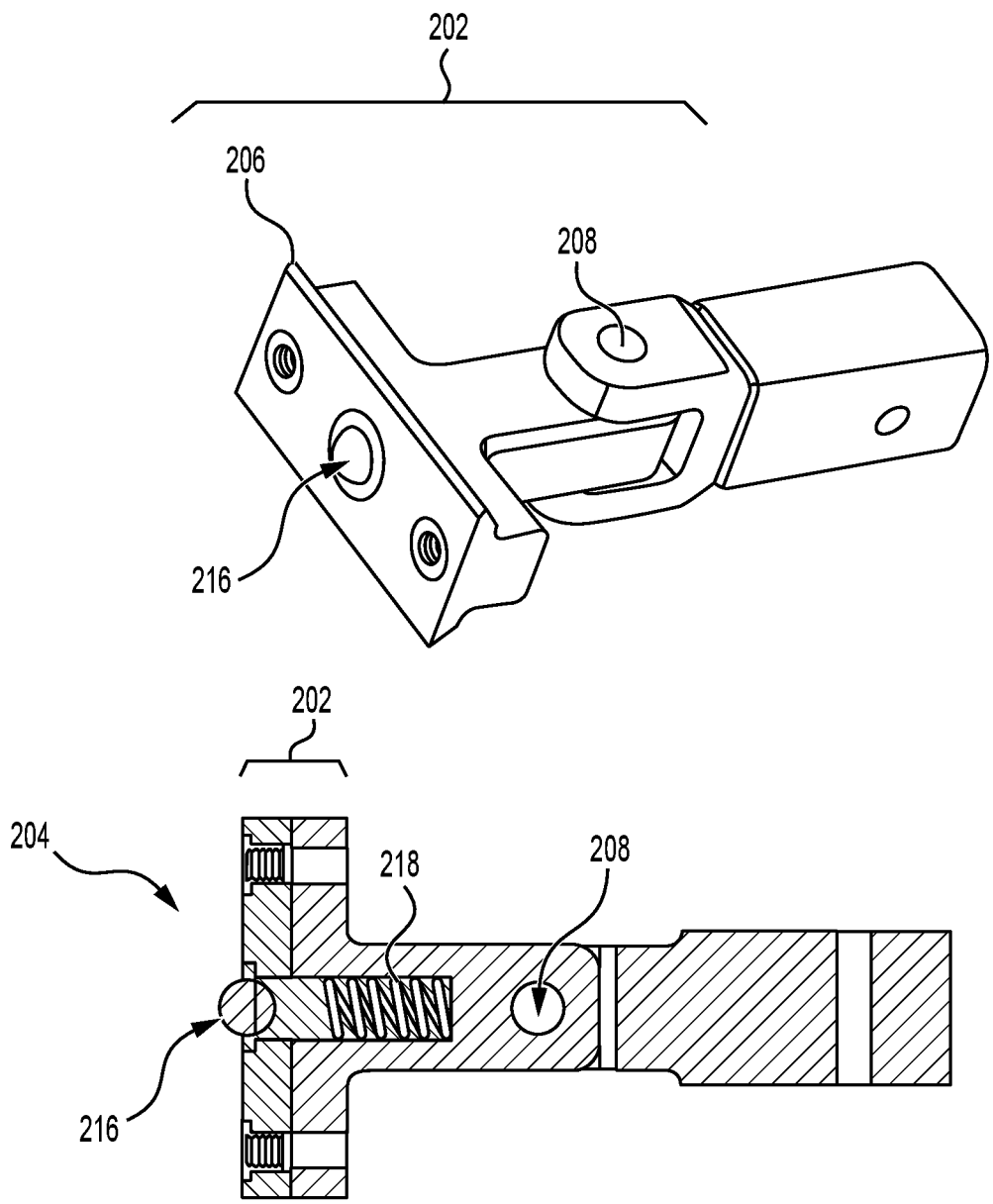
FIG. 5 depicts an embodiment of the locking system.

FIG. 5 depicts a cutaway view of locking mechanism 204 implemented as a ball detent system. Ball 216 extends past the face of low friction block 202 and is biased by spring 218 which resides internal to low friction block 202. The ball 216 engages with cutouts in the track of the vertical beam and helps to resist further upward/downward movement (restricted to one dimension) of low friction block 202. However, the low friction block 202 can be repositioned by exerting an upward or downward force on low friction block 202 that is sufficient to overcome the preload of the detent provided by spring 218. Preferably the force chosen in great enough to resist inertial forces generated during transit of MP 202, but still within the range of allowing movement by a human operator or an automated machine.

Figure 6:
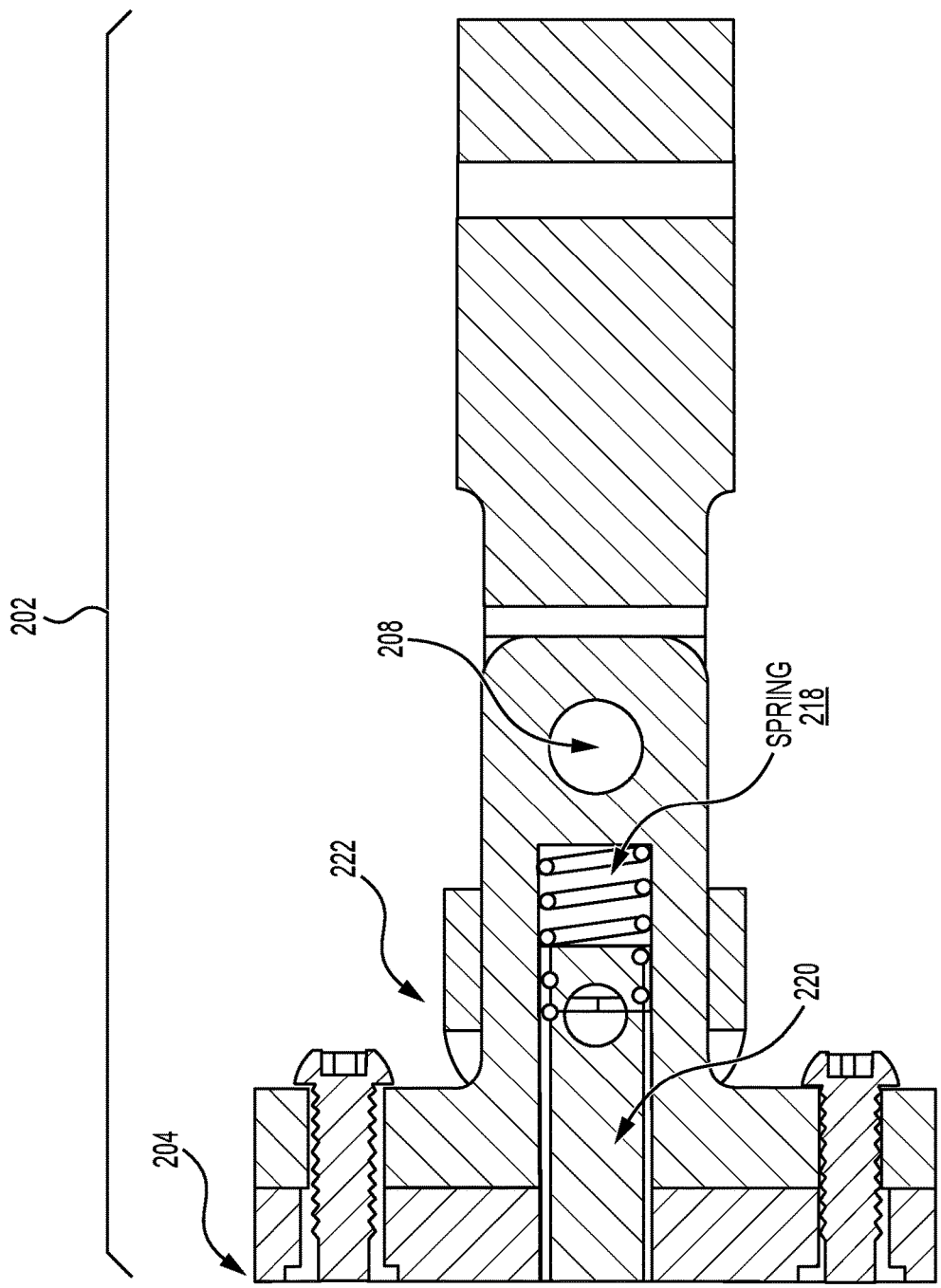
FIG. 6 depicts an alternate embodiment of the locking system.

FIG. 6 depicts an alternate embodiment of locking mechanism 204 employing a slide pin as an alternative to the ball detent system. Similar to the ball detent system depicted in FIG. 5, an internal spring 218 biases the locking pin 220 into the openings in the vertical post. However, unlike the ball detent system, locking pin 220 is coupled to an external locking pin actuator slide 222. Pulling back on the locking pin actuator slide 222 also causes the locking pin 220 to disengage by compressing spring 218. Because the locking pin 220 engages the post parallel to the post opening, vertical force on the beam will not compress the spring and allow the pin to disengage from the post. This embodiment requires the use of locking pin actuator slide 222 to compress the spring and disengage 220 from the post 108.

Figure 7:
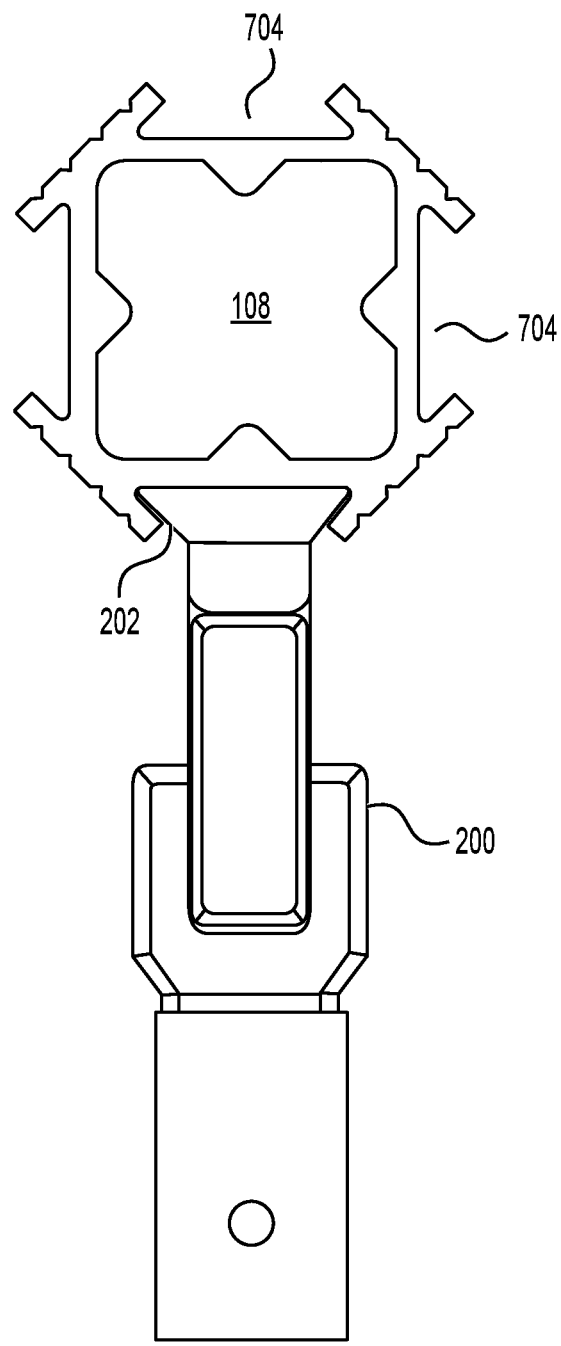
FIG. 7 depicts a top view showing connection between a securement beam and a vertical post according to an embodiment of the invention.

As previously described, low friction block 202 is sized so that it can slide upward or downward in a vertical track integrated into the vertical posts 108. FIG. 7 depicts a cross-section of a vertical post 108 engaged with low friction block 202 according to an embodiment of the invention. This embodiment comprises a total of four securement tracks 704 on vertical beam 108, with each securement track 704 capable of accommodating one or more vertical posts. As shown, the shape of low friction block 202 is chosen so that it can easily slide vertically within securement track 704 in one dimension without disengaging.

Figure 8:
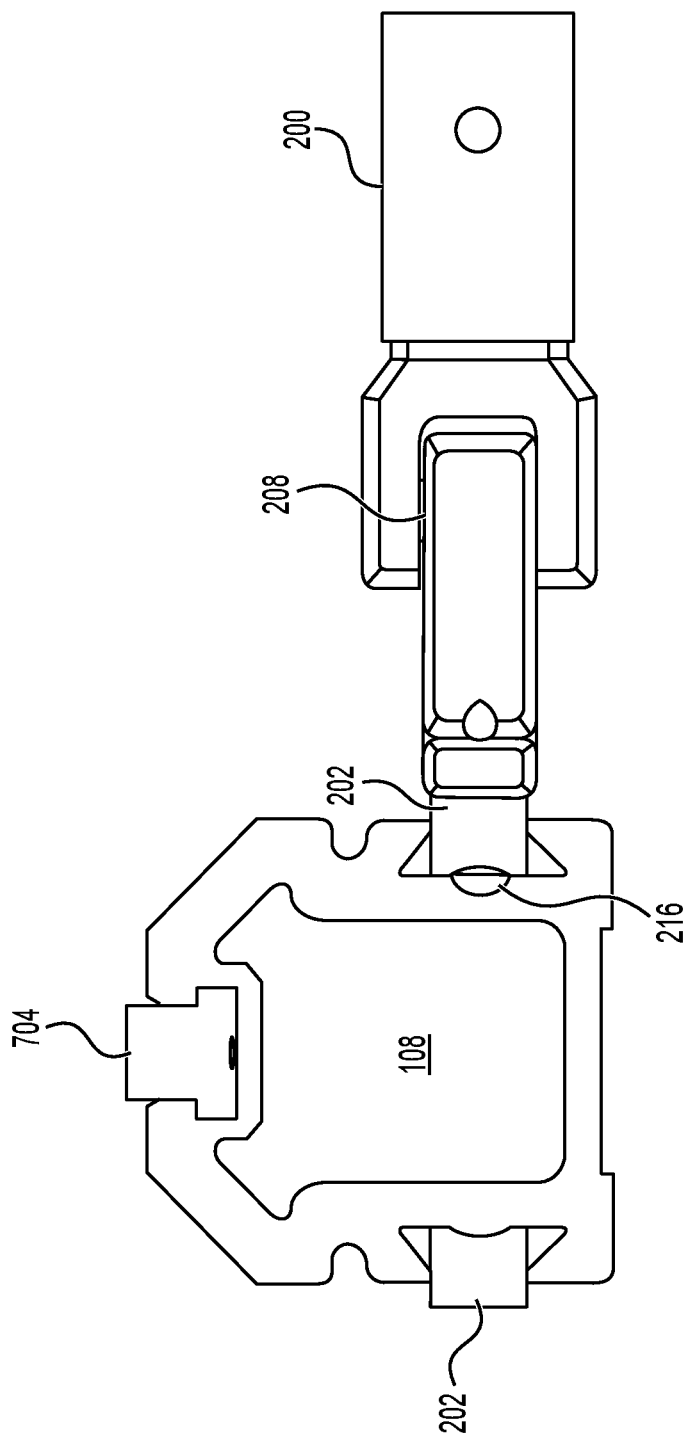
FIG. 8 depicts another top view showing connection between a securement beam and a vertical post according to an embodiment of the invention.

FIG. 8 depicts a cross-section of a vertical post 108 engaged with low friction block 202 according to another embodiment of the invention. In this embodiment there are a total of three securement tracks 704 on a vertical post 108. This embodiment requires a first shape for the opposing securement tracks 704 and a second shape for the third securement track 704 due to the geometry of vertical post 108.

Figure 9:
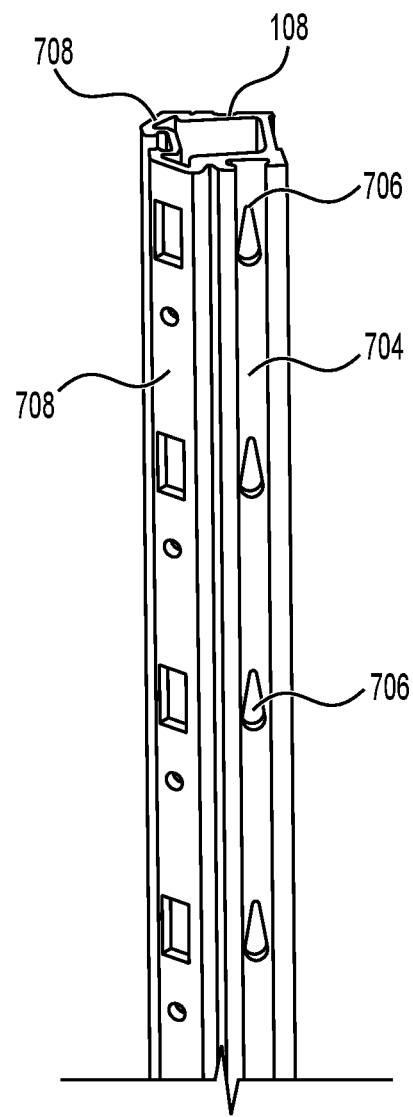
FIG. 9 depicts a view of a vertical post in isolation.

FIG. 9 depicts a perspective view of the vertical post 108 of FIG. 8 in isolation. The locking mechanism 204 is designed to couple with cutouts 706 which are equally spaced within each securement track 704. Preferably, each cutout 706 has a tear drop shape which reduces the force needed to raise securement beam 200 compared to lowering. This makes upwards repositioning of securement beam 200 easier.

FIG. 9 also depicts modular deck tracks 708 which are used for securing modular decks. Because the modular deck tracks 708 are separate from the securement tracks 704, the securement beams 200 can be moved independently of modular the modular decks.

Figure 10:
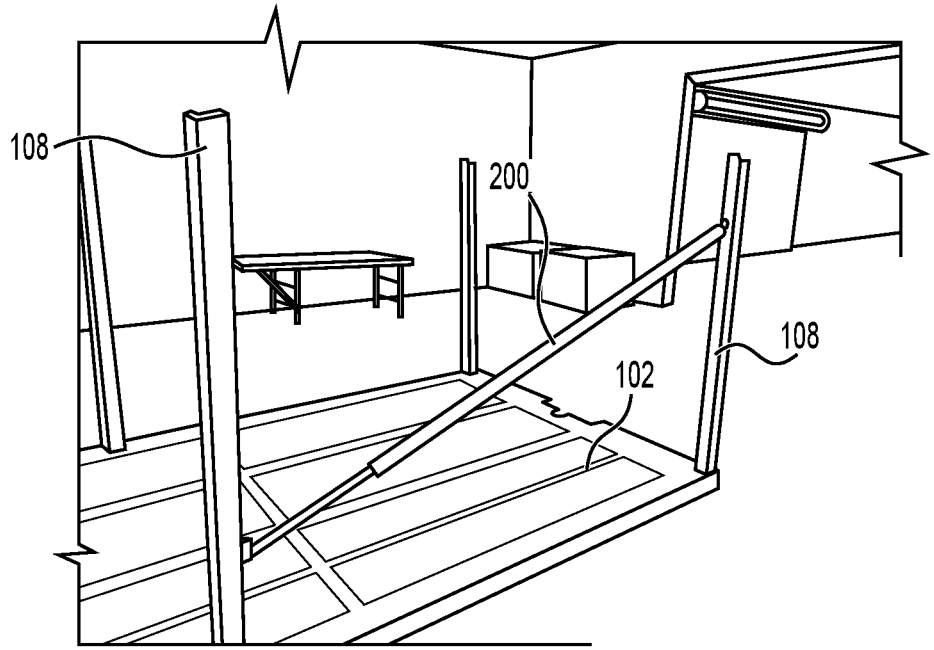
FIG. 10 depicts a view of a securement beam fastened to two vertical posts at an angle.

FIG. 10 depicts an example of securement beam 200 coupled to two vertical posts 108 at an angle. In a preferred embodiment, the adjustment angle of the securement beam 200 with respect to the vertical post 108 is 0-45°. A first end of securement beam 200 is at a lower height than a second height of securement beam 200. Because sliding beams 206 can telescope with respect to central beam 210, the length of securement beam 200 is automatically adjusted as the first end and the second end are adjusted. Further, pivot joints 208 allows one end to be positioned higher relative to the other end of securement beam 200.

Figure 11:
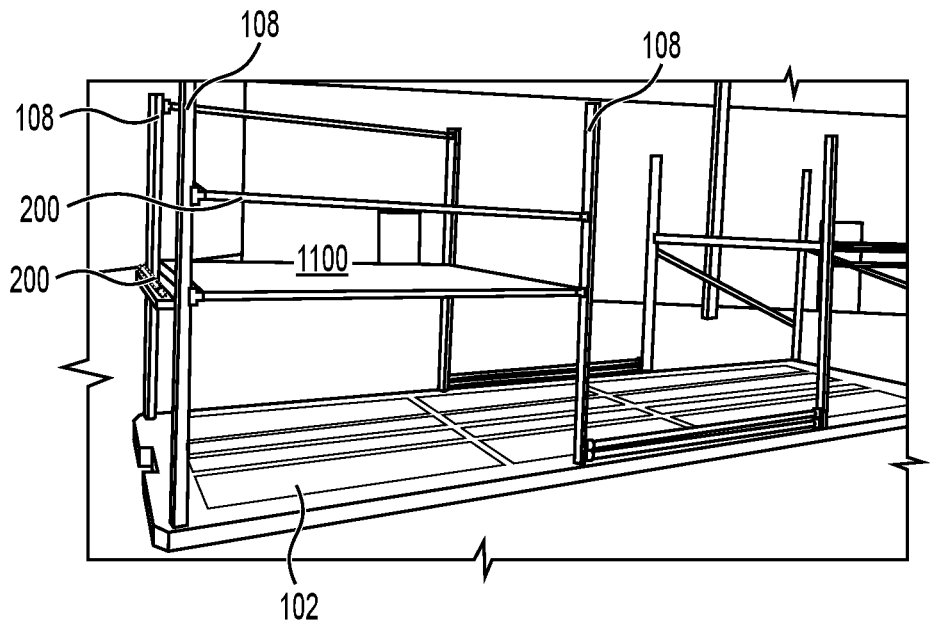
FIG. 11 depicts a view of multiple securement beams and a modular deck coupled to an MP.

FIG. 11 depicts a view of an MP 102 having a plurality of securement beams 200 and a modular deck 1100. As shown, the securement tracks 704 are positioned at outer edges of vertical posts 108, allowing securement beams 200 to be moved independently of and past modular deck 100. The modular deck track 708 is positioned at an inner edge of each vertical post 108, allowing the modular deck 1100 to move up or down within modular deck tracks 708 without interfering with the placement of securement beams 200.

If securement beams 200 are in need of maintenance or replacement, each end of securement beam 200 can simply be lifted past the end of securement track 704 to disengage it from MP 102. In a similar manner, additional securement beams can be installed by lowering each low friction block 202 into an opposing securement track 704, after which the securement beam 200 can be positioned.

Figure 12:
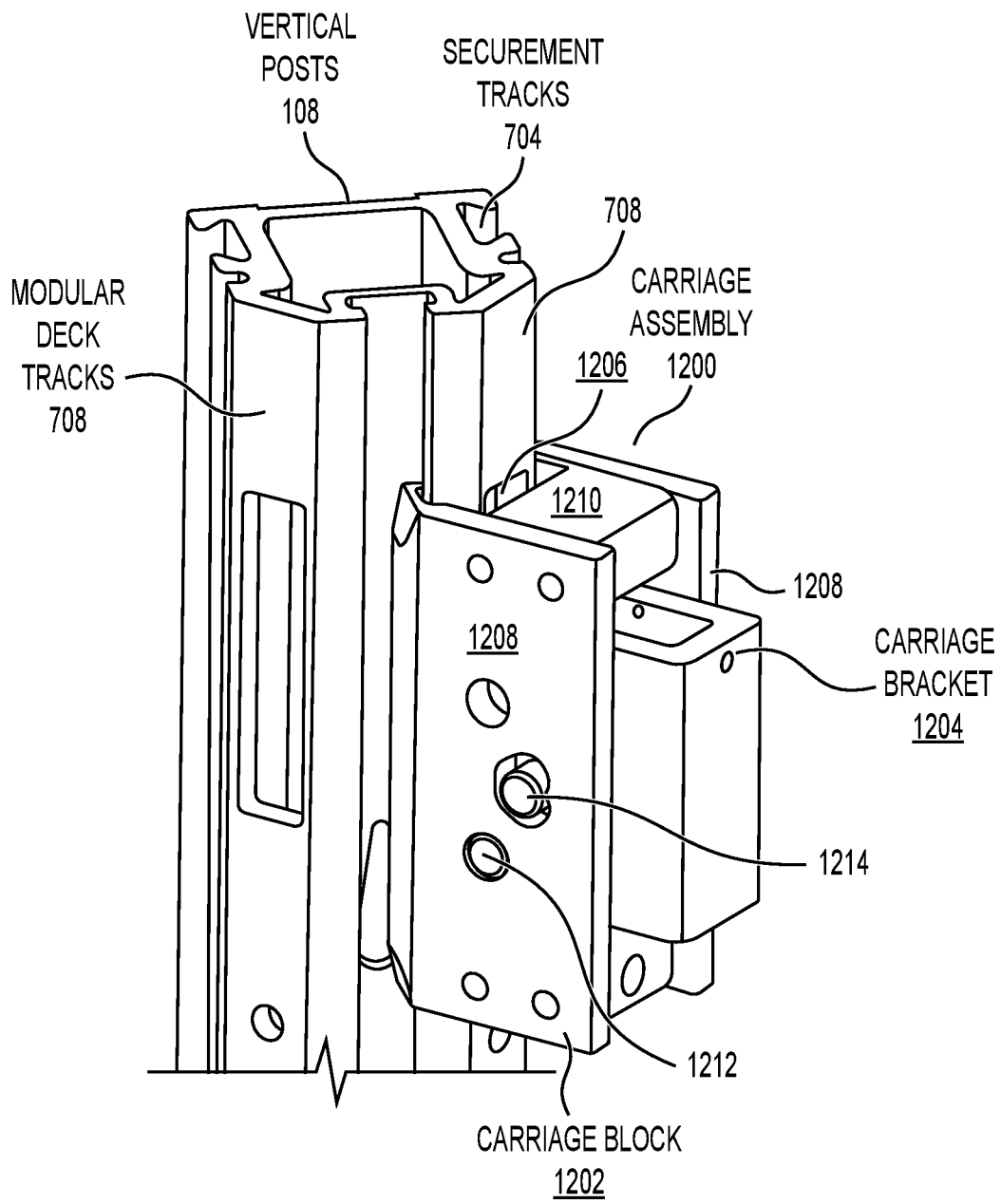
FIG. 12 depicts a perspective view of a carriage assembly for use with a modular deck.

FIG. 12 depicts a perspective view of carriage assembly 1200 coupled to a vertical post 108. Carriage assembly 1200 comprises carriage block 1202 and carriage bracket 1204. The carriage block 1202 is formed from two halves bolted together at the top and bottom to secure carriage bracket 1204 within. Each half of carriage block 1202 ends in two lips which allow carriage assembly 1200 to slide vertically with respect to modular deck track 708 (See FIG. 9). Carriage block 1202 functions as a low-friction bushing and is preferably constructed from a low-friction material such as Delrin, fiber reinforced composite, high density plastic, etc. The carriage block 1202 reacts and transmits X & Y forces from the modular deck 104 to the vertical post 108.

The carriage bracket 1204 engages with evenly spaced openings 1206 spaced along modular deck tracks 708. A method for moving carriage assembly 1200 up/down to another opening 1206 will be described later.

Each corner of a modular deck 104 is coupled to a carriage assembly 1200 which in turn couples the modular deck to vertical post 108. This allows the height of modular deck 104 to be raised or lowered easily, either by an automated vehicle or a human operator. Further, as will be shown, the human operator does not have to leave the vehicle to unlock/lock the carriage assembly 1200 which increases safety.

As previously mentioned, carriage block 1202 is formed from two guide rails 1208 and are coupled together at upper and lower rail blocks 1210. Carriage block 1202 can pivot on pin 1212 that is fixed in carriage bracket 1204. The pivoting motion is limited by slot 1214. This connection allows for some freedom of movement between the guide rails 1208 and the modular deck 104.

Figure 13:
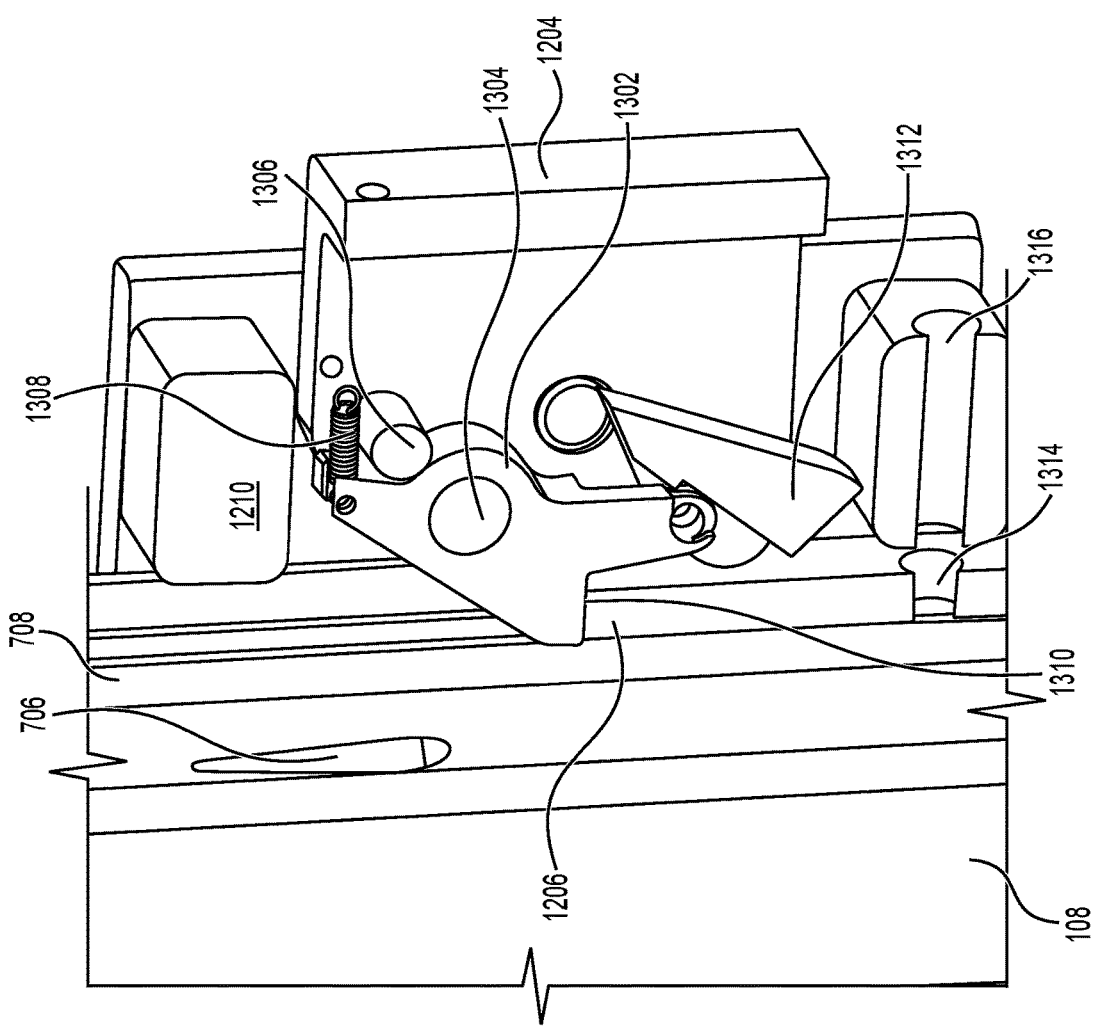
FIG. 13 depicts a view of the carriage assembly with the carriage block removed.

FIG. 13 depicts a view of carriage assembly 1200 with one half of the carriage block 1202 removed. Carriage bracket 1204 comprises support cam 1302 which pivots about pin 1304. Support cam 1304 is biased against limiting pin 1306 by spring 1308. Flat edge 1310 of support cam 1302 supports the weight of modular deck 104 at the bottom of the opening 1206 (which is also flat) on vertical post 108. FIG. 14 depicts a cutaway view of vertical post 108 showing the extension of flat edge 1310 into vertical post 108 through an opening 1206.

When carriage assembly 1200 is raised, support cam 1302 rotates out of the way (counterclockwise in FIG. 13). The rotation of support cam 1302 also causes locking cam 1312 to rotate because the two are coupled and spring loaded so that they both rotate (clockwise in FIG. 13) into the retracted position. Modular deck track 708 also comprises a plurality of evenly spaced locking holes 1314 through which a pin can be inserted from the modular deck 104 to help lock it in place as a redundant safety measure. The pin extends through bore 1316 in the lower rail block 1210.

FIG. 15 depicts how the openings 1206 and locking holes 1314 are arranged in pairs along the length of modular deck track 708. The number, spacing, and size of openings 1206 and locking holes 1314 can be varied.

Figure 16A:
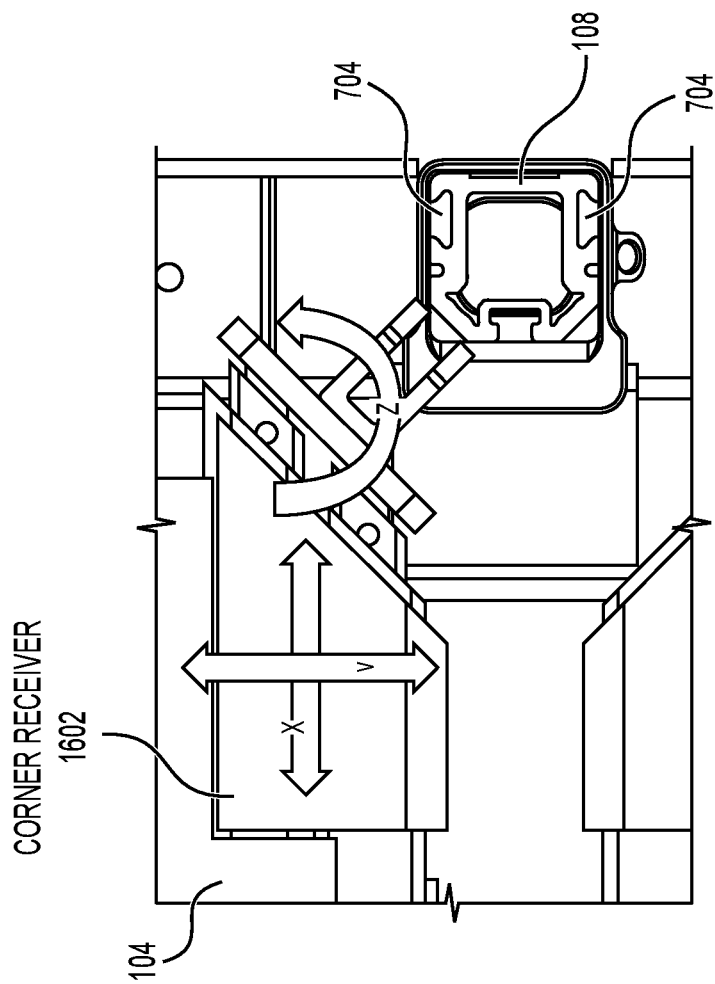
FIGS. 16A-16B depict a view of a corner receiver for use with a modular deck.
Figure 16B:
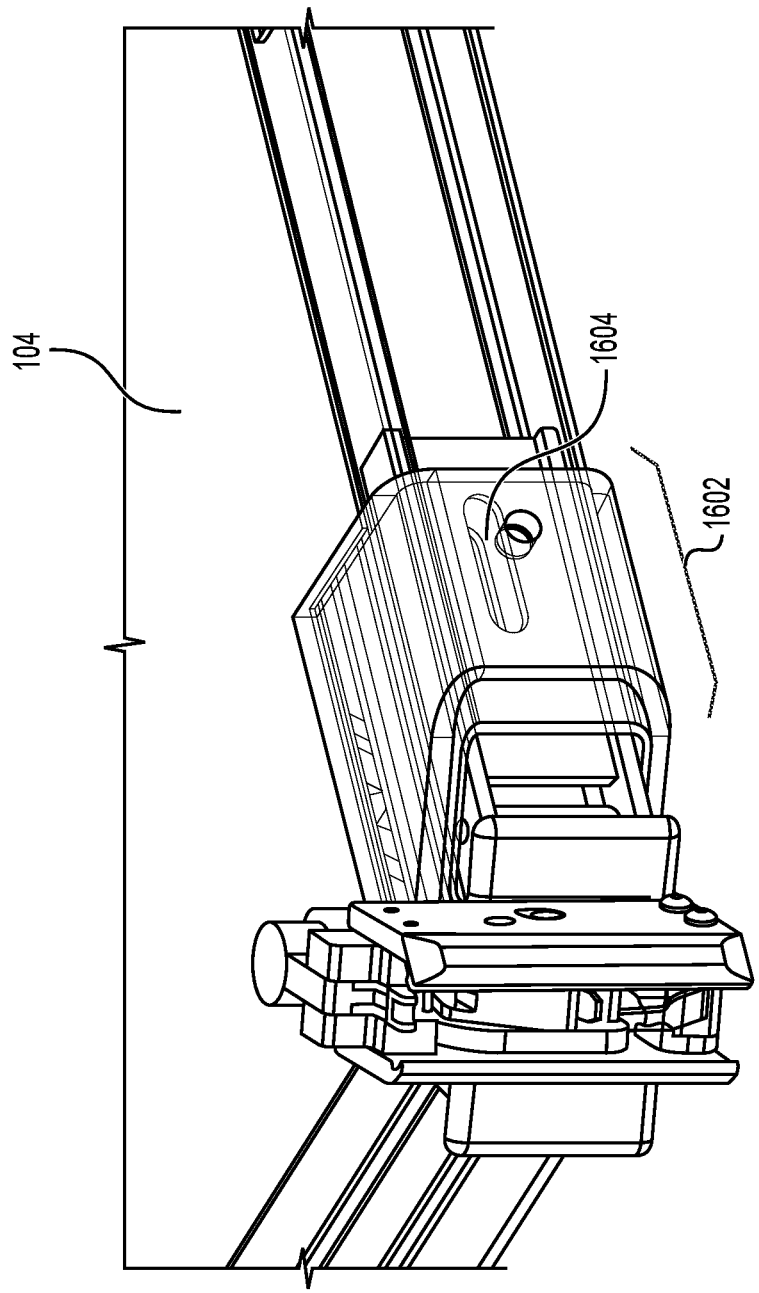

FIGS. 16A and 16B depict the coupling between a corner of modular deck 104 and carriage assembly 1200. The carriage bracket 1204 is coupled to a corner receiver 1602 coupled to the corner of modular deck 104. The receiver allows for limited movement in the X, Y, and Z directions with respect to carriage assembly 1200. The corner receiver 1602 transmits loads from the surface of modular deck 104 to vertical posts 108 while still retaining some freedom of motion.

The deck corner is designed with "sliders" 1604 that insert into each corner of the table. They are retained within the table in a way (pin and slot) that allows for movement in and out, which makes moving deck 104 easier by adjusting to offset any variations in the posts 108 due to manufacturing tolerances, freight, etc. This also provides as a quick and easy, tool-less removal process of the corner receiver 1602 for storage, repair, or swapping to different configurations.

Figure 17A:
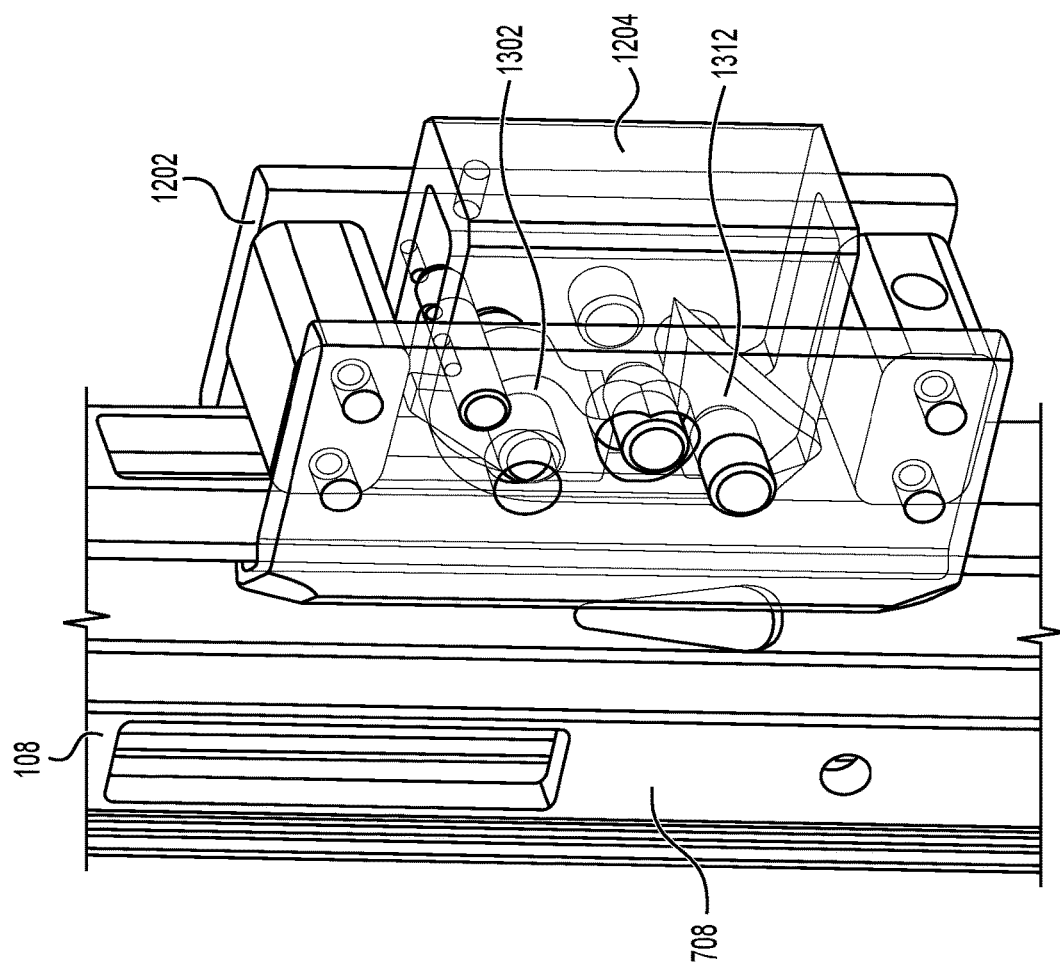
FIGS. 17A-17F depict a view of the carriage block shown in phantom.

The steps utilized to raise or lower carriage assembly 1200 will now be described with respect to FIG. 17A. To move the carriage assembly 1200 to a higher assembly, the modular deck 104 is raised past the desired opening 1206 (e.g., a set distance d3 above). The table is then lowered. As support cams 1302 enter openings 1206, the spring 1308 moves the cam against limiting pin 1306 such that flat edge 1310 extends into openings 1206. The modular deck 104 can then be lowered until flat edge 1310 of all four support cams 1302 contact the lower edge of openings 1206.

Figure 17B:
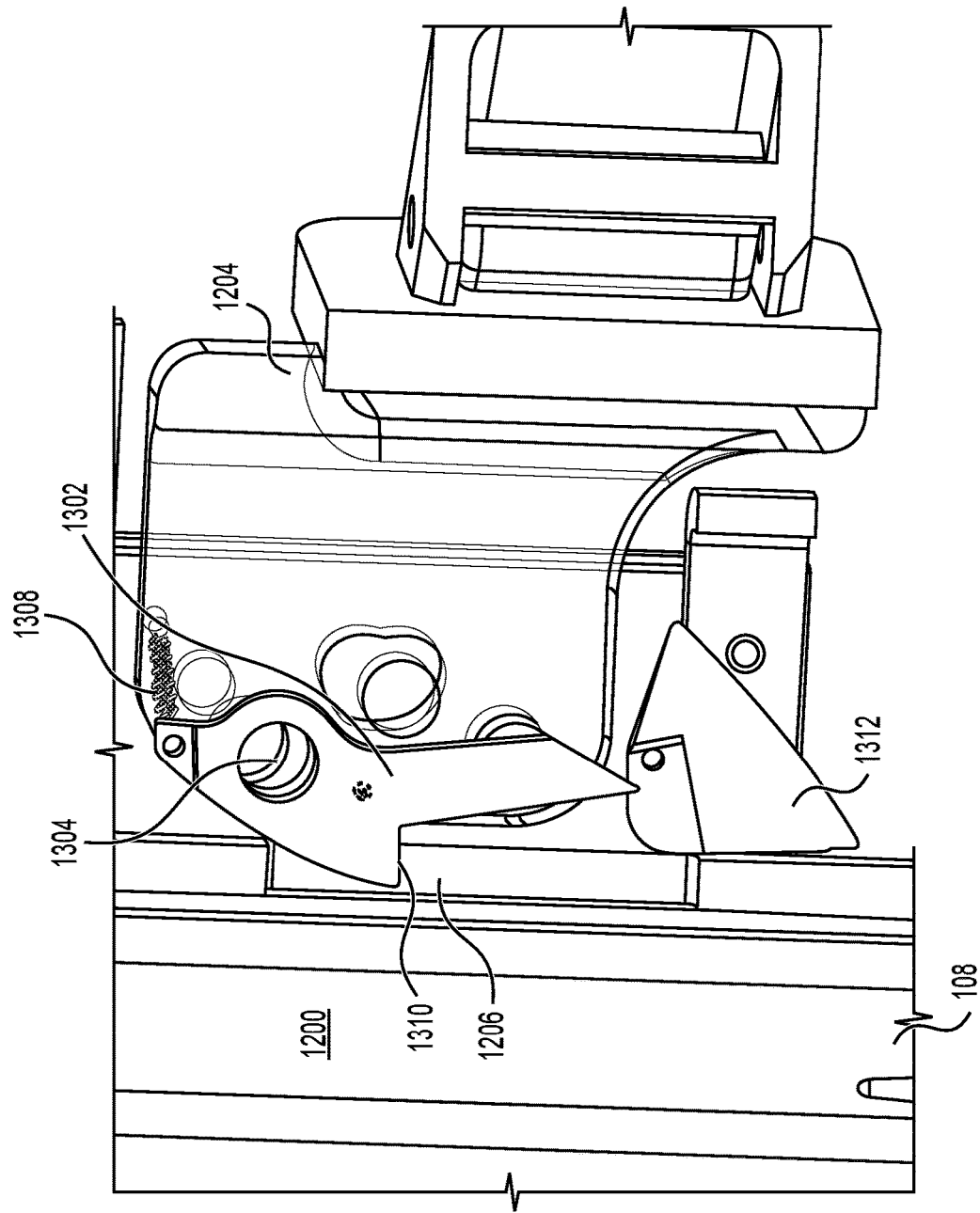

Support cam 1302 would contact the lower edge of openings 1206 in this position (FIG. 17B) and lock the deck 104 in position. The edge of locking cam 1312 is not beyond the edge of the post cutout 1206.

To move carriage assembly 1200 to a lower position, modular deck 104 is raised a set distance d1 (e.g., 3"), causing locking cam 1312 to rotate and preventing support cam 1302 from reengaging. The modular deck 104 is then lowered a set distance (d2) past the intended position. The modular deck 104 is now below the desired opening and the method for raising the carriage assembly 1200 can be utilized.

Figure 17C:
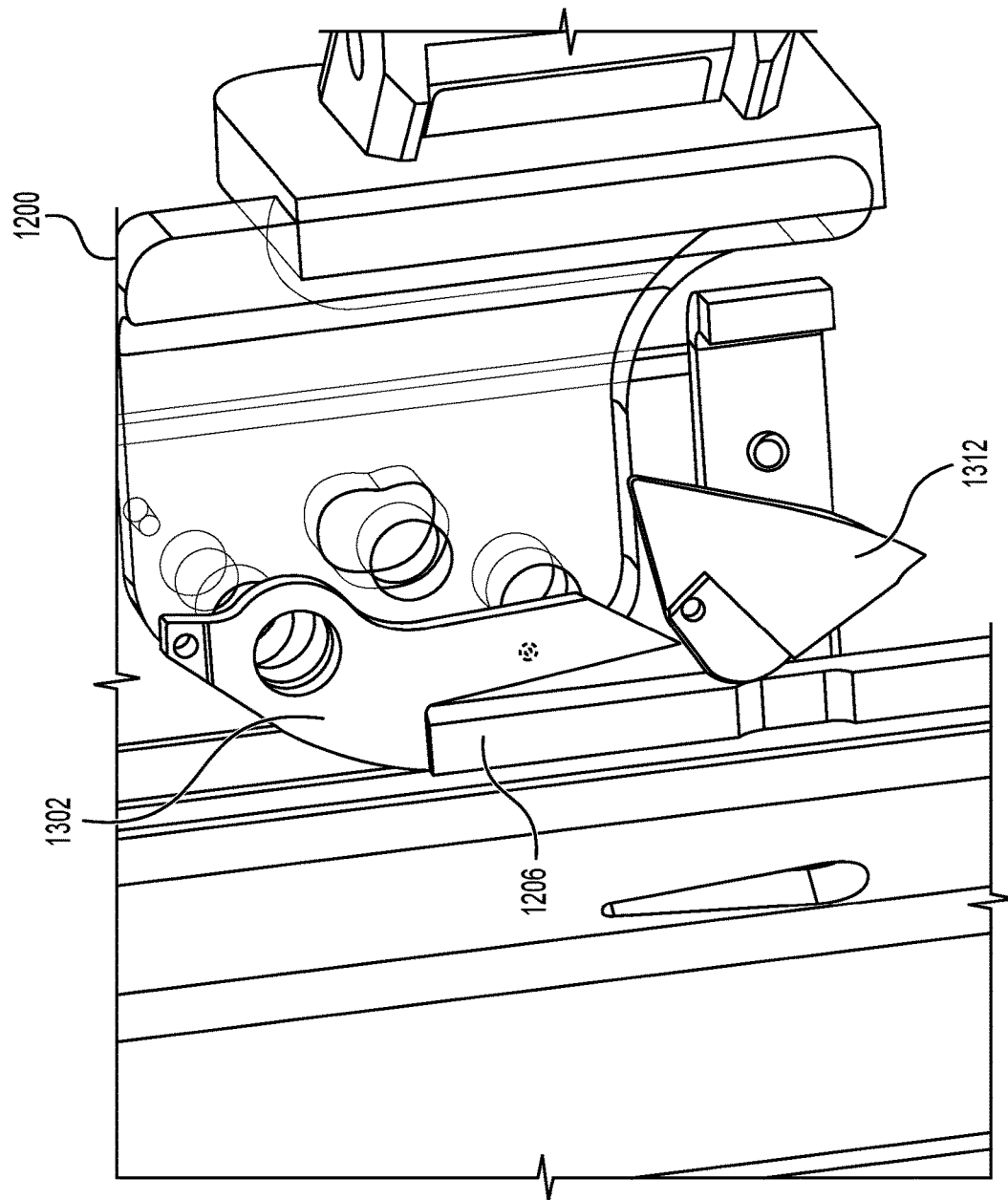
Figure 17D:
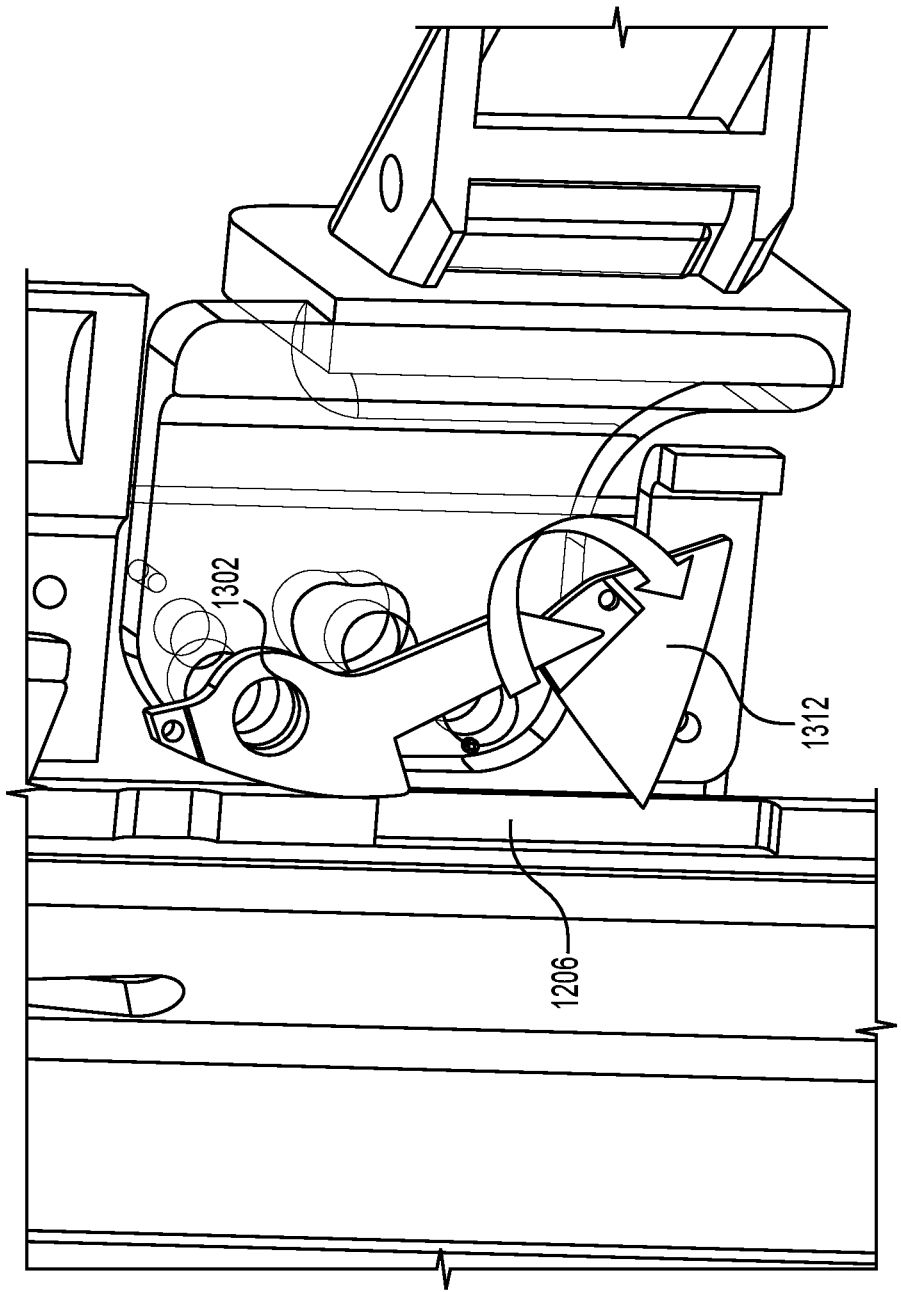

FIG. 17C depicts carriage assembly 1200 in a locked position where support cam 1302 is resting on post cutout 1206. Carriage assembly 1200 is raised causing locking cam 1312 to disengage once it is within post cutout 1206 as shown in FIG. 17D. Locking cam 1312 is spring loaded. Carriage assembly 1200 can now be lowered.

Figure 17E:
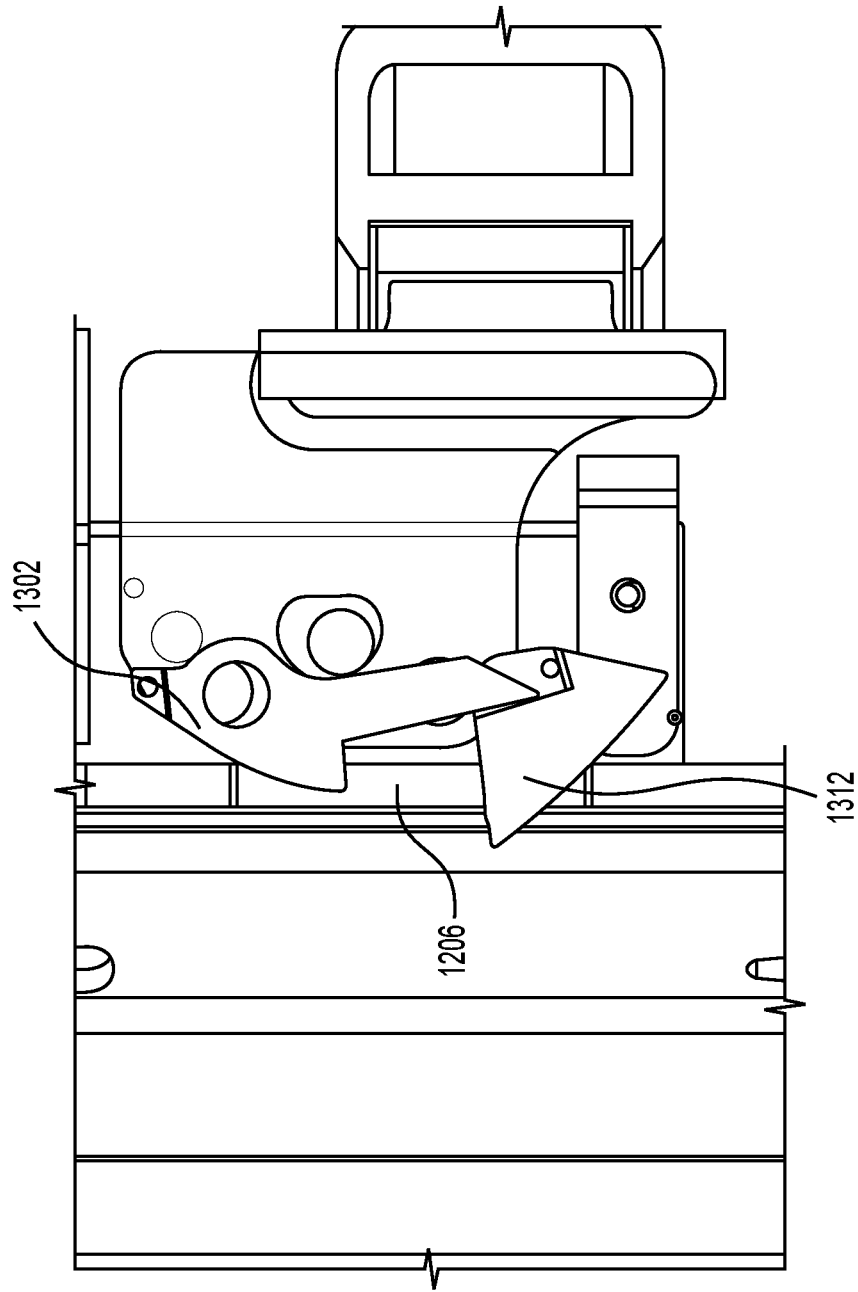
Figure 17F:
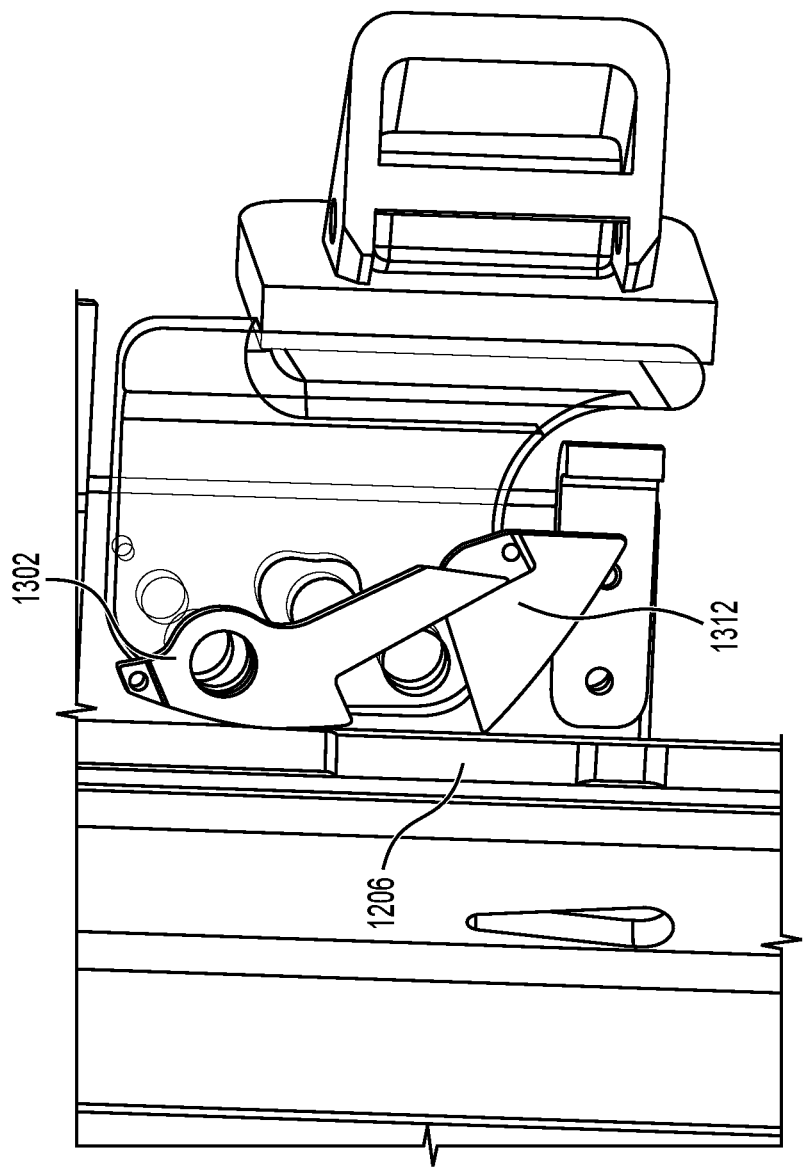

As carriage assembly 1200 is lowered, locking cam 1312 contacts the bottom of post cutout 1206 as depicted in FIG. 17E. Carriage assembly 1312 is designed so that it rotates both the locking cam 1312 a support cam 1302 out of the way during lowering. Carriage assembly 1312 is coupled to a support lever and pushes the assembly out of the way and remains in contact with the post to a point that prevents the support lever from engaging with the post 108 as depicted in FIG. 17F.

Figure 18:
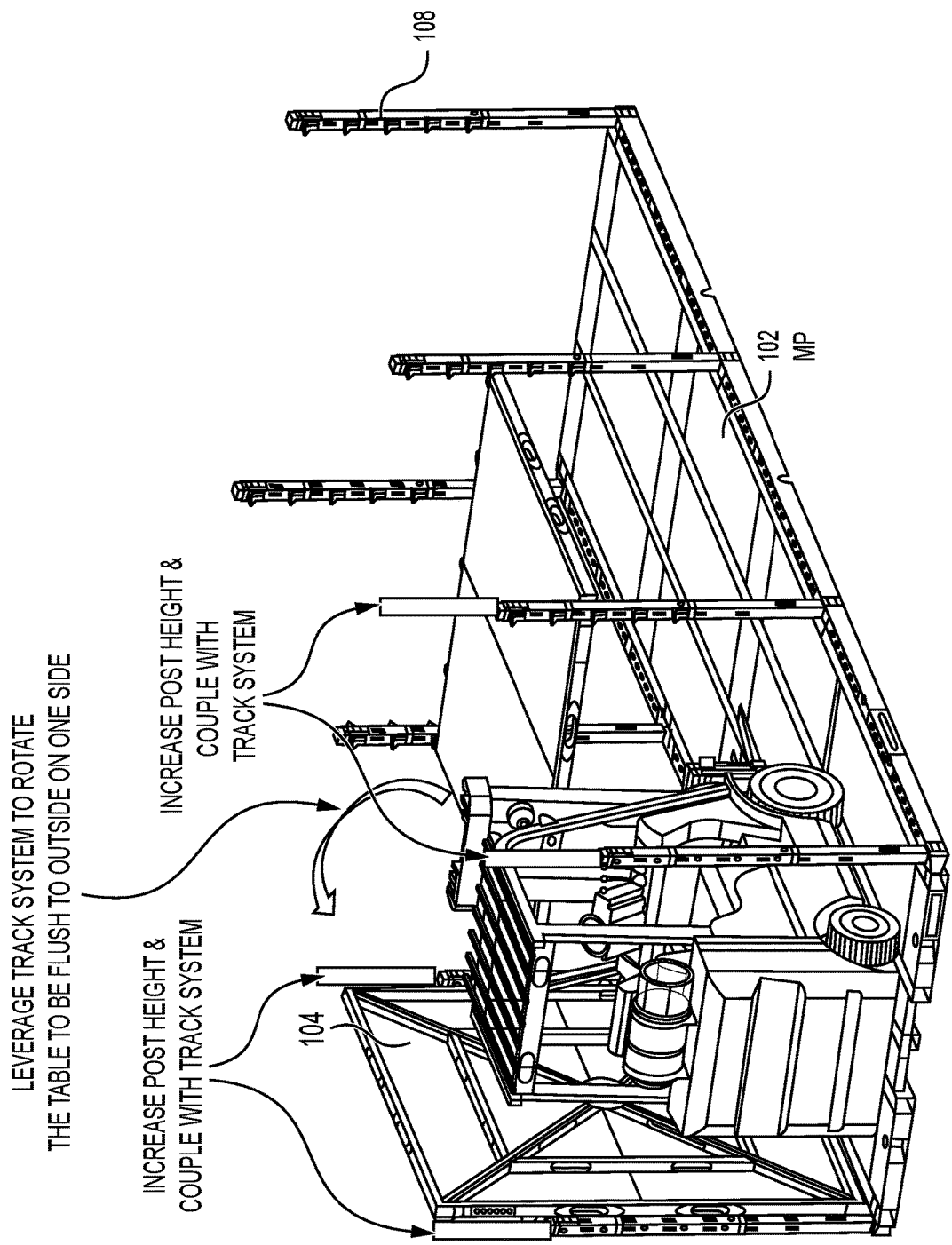
FIG. 18 depicts a view of a MP with showing a modular deck being stowed.
Figure 19:
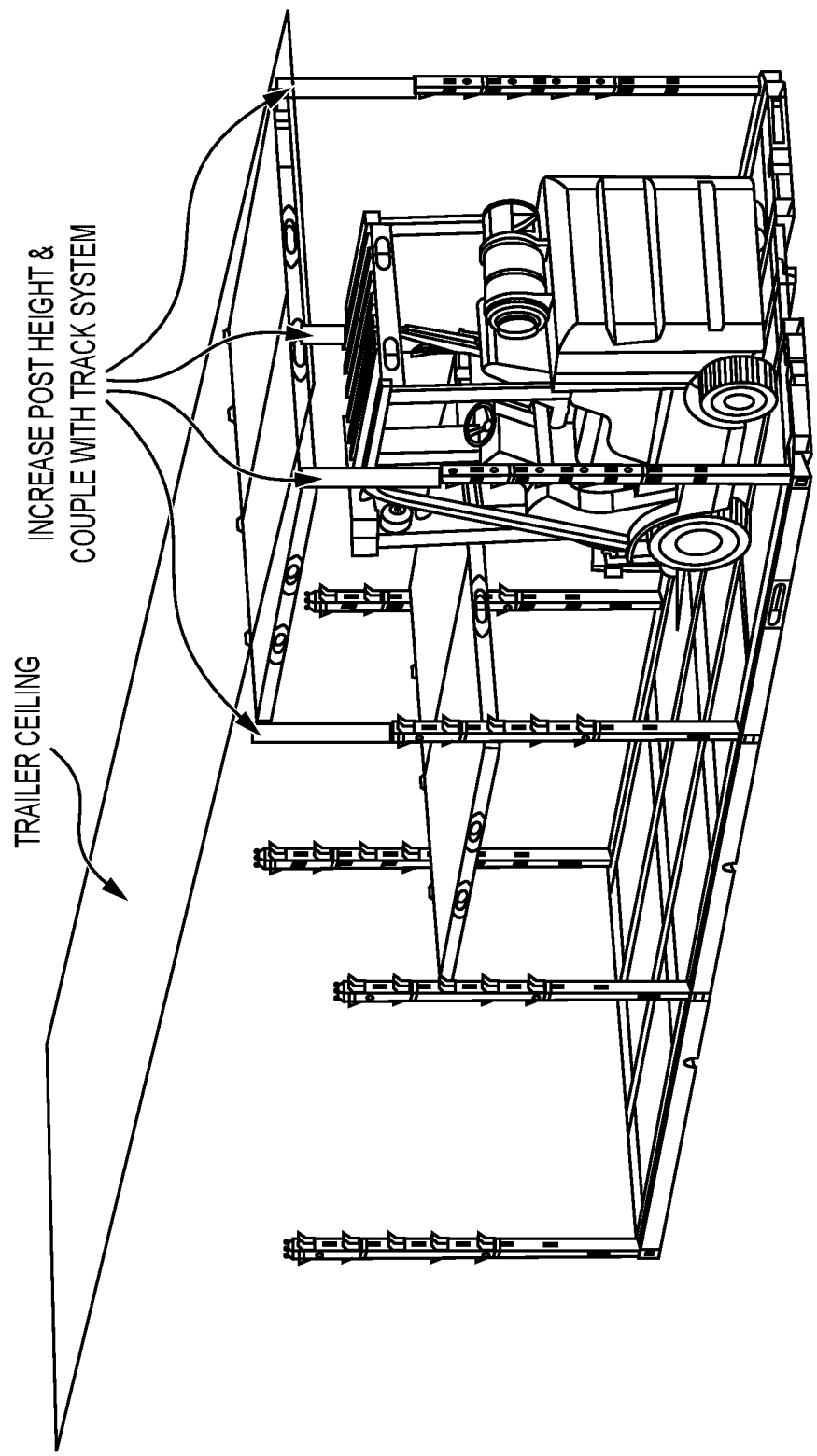
FIG. 19 depicts a view of the vertical posts extended with a modular deck placed thereon.

The construction of carriage assembly 1200 provides several advantages over other track systems as depicted in FIGS. 18 and 19. First, modular decks 104 are confined to movement in the z direction which greatly simplifies the raising and lowering of the modular decks 104, especially if automation is required. As shown in FIG. 18, the vertical posts 108 can be equipped with extensions and the modular deck tracks 708 can be integrated into the extensions. The modular decks can be easily relocated to the side or overhead as depicted in FIG. 18. The increased height of vertical posts 108 also allows the modular decks 104 to be moved much closer to the trailer ceiling as depicted in FIG. 19. This allows a forklift to be used on the MIP 102 even if it is in a trailer.

Each modular deck 104 may incorporate an active fork lock 2000. Each modular deck 104 has openings to receive the tines of a forklift. When no forklift tines are sensed, a pin will always be inserted through bore 1316 into locking hole 1314, preventing movement of the modular deck. Then, when tines are sensed, the locking pin is withdrawn.

Figure 20:
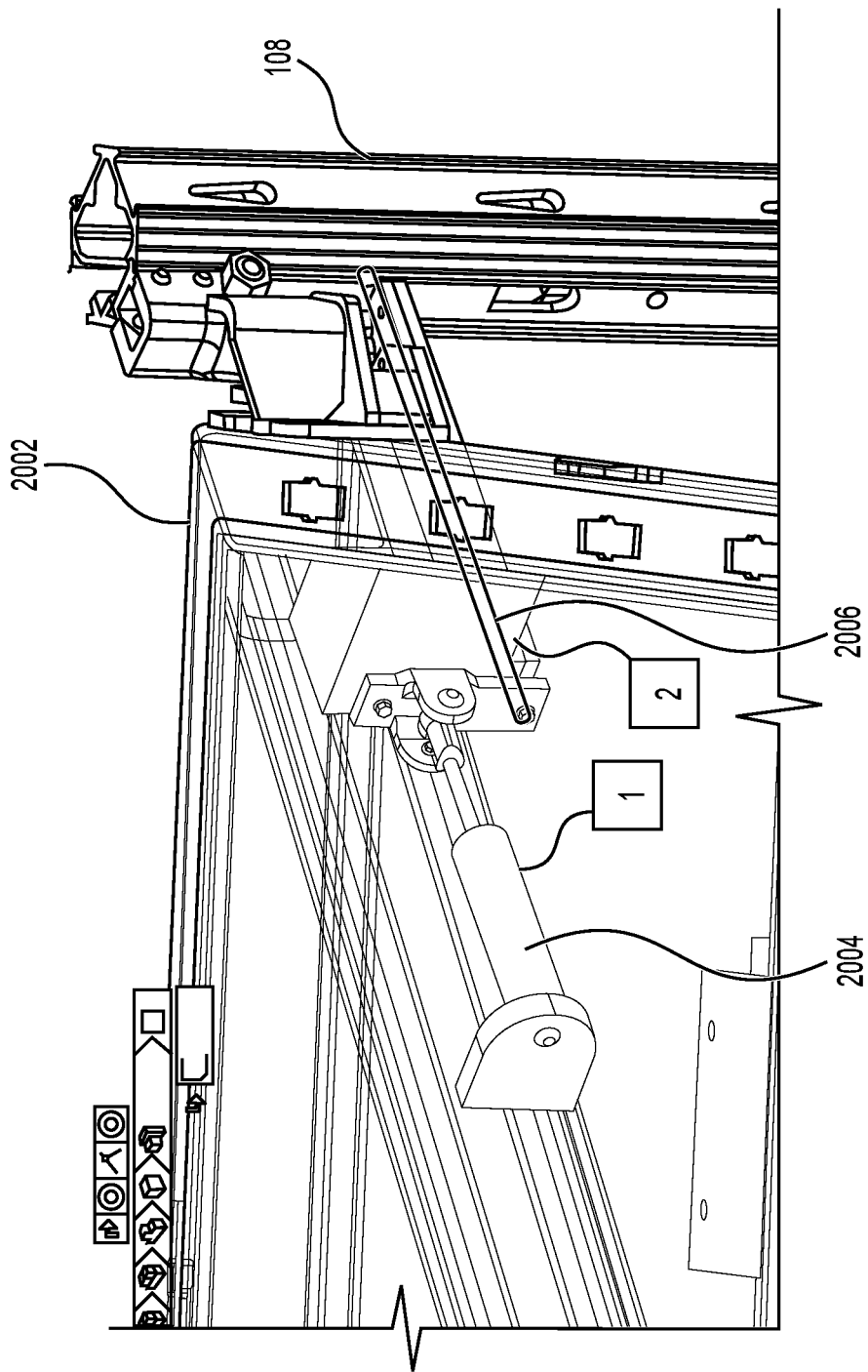
FIG. 20 depicts a lock side mechanism of a locking mechanism of the modular deck.
Figure 21:
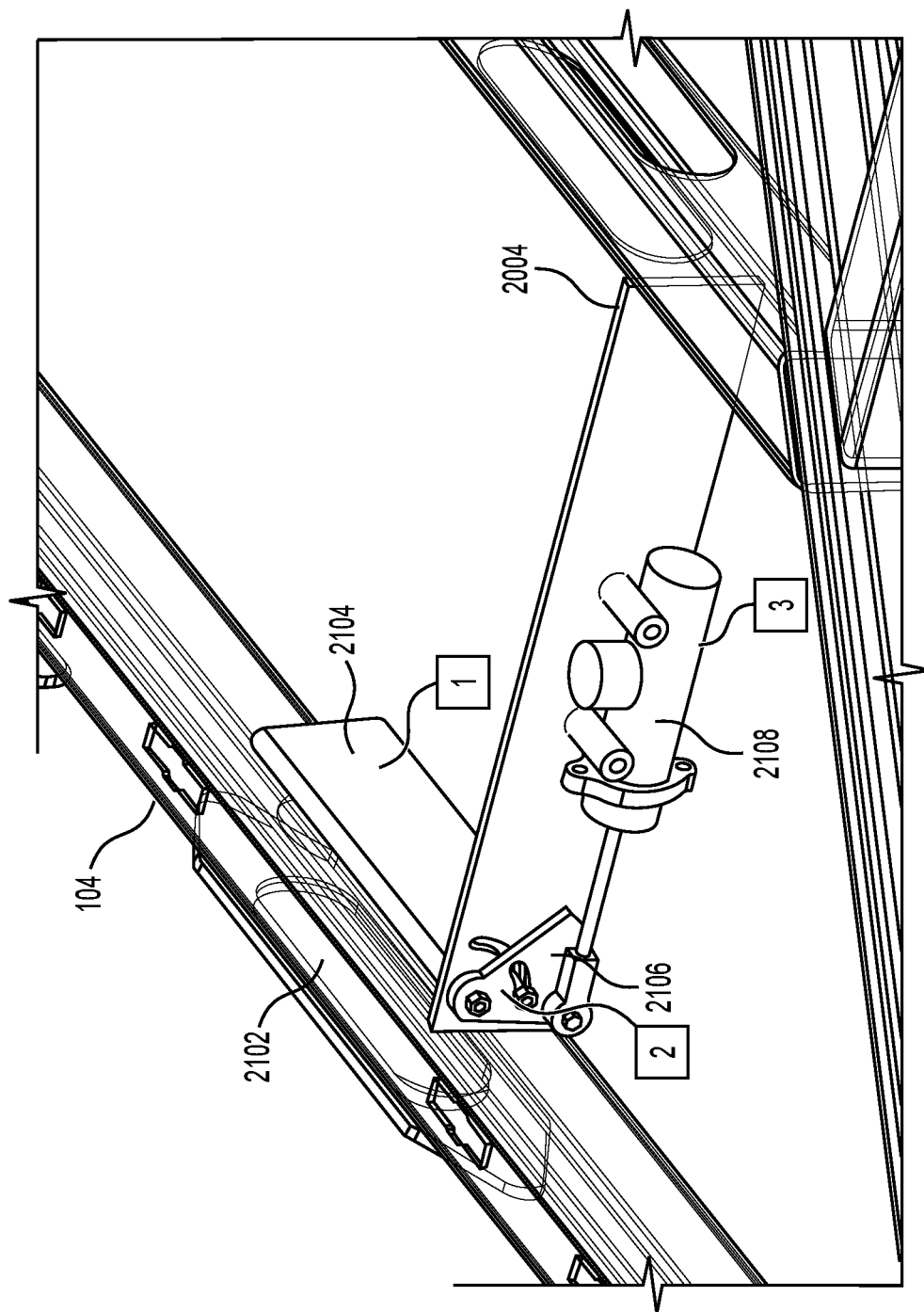
FIG. 21 depicts a fork side mechanism of the locking mechanism.

The active fork lock comprises a lock side mechanism 2002 (FIG. 20) and a fork side mechanism 2004 (FIG. 21). The lock side mechanism 2004 comprises a pressurized cylinder 2004 coupled to a pin 2006. The expansion or compression of the pressurized cylinder 2004 causes the pin 2006 to engage/disengage from locking holes 1314 in vertical post 108. The pin 2006 is always extended unless a forklift engages with fork side mechanism 2004.

As previously discussed, each modular deck 104 comprises an opening 2102 for engaging the tines of the forklift. When a tine enters opening 2102, it rotates flap 2104. This causes timing plate 2106 to also rotate. The timing plate 2106 allows the fixed input from the flap 2014 to be adjusted to max the stock of cylinder 2108 without damaging it. As the cylinder 2108 gets compressed, it pressurizes a hydraulic loop coupled to pressurize four cylinder 2004s (at each corner), causing pins 2006 to withdraw from locking holes 1314.

Figure 22:
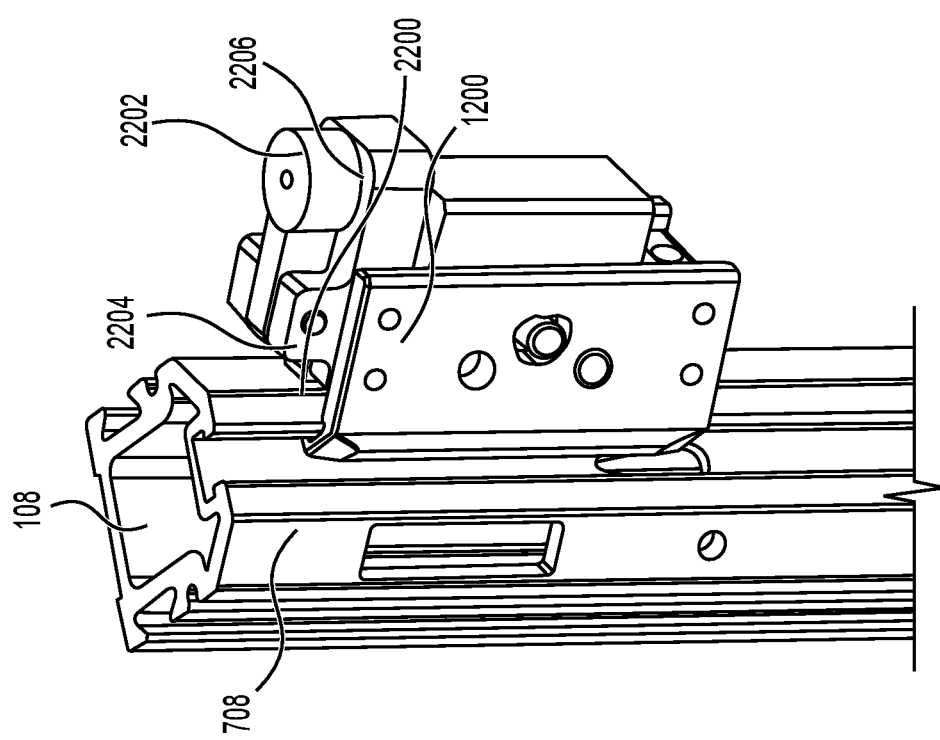
FIGS. 22-24 depict views of a passive interlock.
Figure 23:
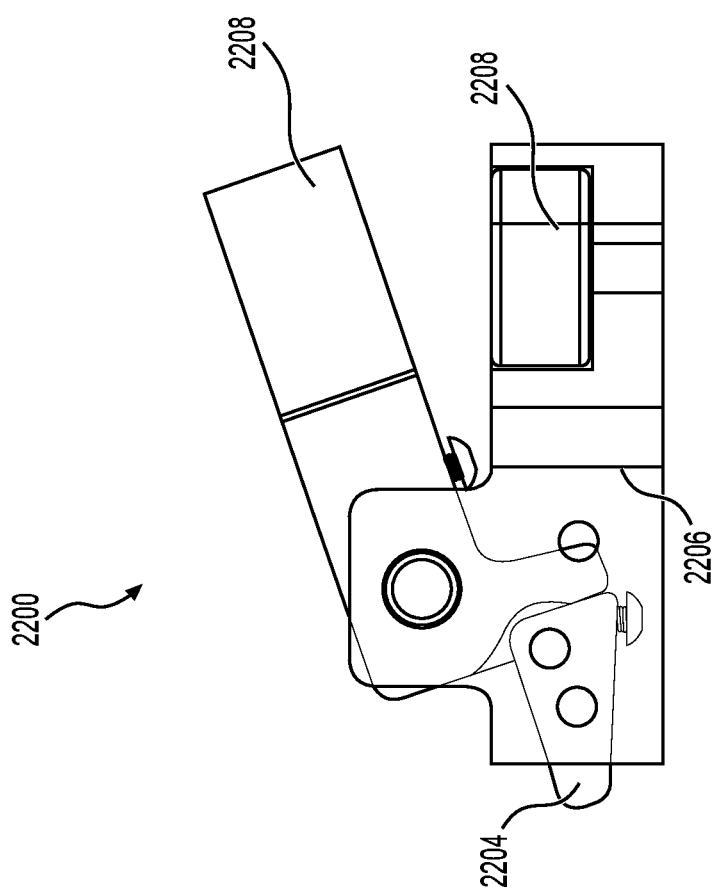
Figure 24:
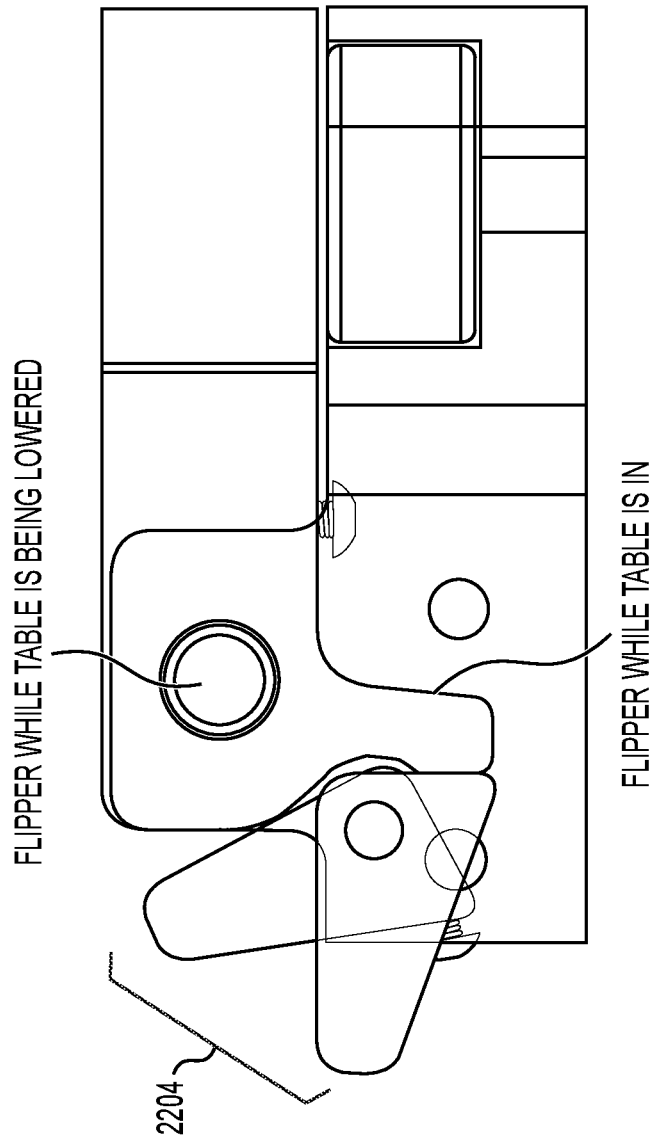

FIGS. 22-24 depict views of a passive interlock mechanism 2200 for use with carriage assembly 1200. The passive interlock mechanism 2200 prevents modular deck 104 from unintentionally rising to a height such that the modular deck 104 falls to the ground or becomes tilted. The passive interlock mechanism 2200 comprises lever 2202, flipper 2204, body 2206, and magnets 2208. A first magnet 2208 is installed within the body 2206 and a second magnet 2208 is installed on the lever 2202. A dashpot or extension spring can be used in place of the magnets to achieve a similar result.

In order for the modular deck 104 to be raised, the flipper 2204 and lever 2202 must rotate out of the way. The magnets 2208 prevent this from happening until the force exerted on the modular deck 104 is greater than the magnetic force. Toe force from the magnets 2208 prevents the modular deck 104 form bouncing during transit, but the force can easily be overcome by a forklift.

FIG. 24 depicts the position of flipper 2204 and lever 2202 when the table is being lowered. The flipper 2204 rotates out of the way and a spring (not shown) pulls the flipper 2204 back to its resting position to lock the modular deck 104 into its new position.

The improved control, resolution, and simplicity that the track system incorporates into the placement of the modular deck 104 allows for increased functionality in operated in both a manual and autonomous environment. The modular deck 104 can be better utilized to block and brace freight to forward and reverse forces that are experienced during transportation. Reducing the complexity of modular deck 104 repositioning increases the functionality of the modular deck 104 because operators will more frequently position the table to be a dual-purpose device, reducing the need for secondary freight securement operations.

The track system increases the number of vertical placement positions to 10-20+, significantly increasing the customization of modular deck 104 placement with respect to the continually changing load profile. Any previously underutilized spaced is replaced with freight, resulting in increased efficiency.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A carriage assembly for a modular deck comprising:
   a carriage block; and
   a carriage bracket for coupling the modular deck to the carriage assembly,
   wherein the carriage block comprises:
      a first guide rail having a first lip;
      a second guide rail having a second lip;
      a first rail block coupling a top of the first guide rail to a top of the second guide rail; and
      a second rail block coupling a bottom of the first guide rail to a bottom of the second guide rail,
   wherein the first lip and the second lip together form a track opening for engaging a securement track on a vertical post;
   wherein the carriage block comprises:
      a housing;
      a support cam pivotally coupled to a housing of the carriage block,
      wherein a top of the support cam is biased against a limiting pin by a biasing spring, and
      wherein a flat edge of the support cam is parallel to the top of the first guide rail when the carriage assembly is engaged with a deck opening in the securement track; and
      a locking cam pivotally coupled to the housing below the support cam,
      wherein counterclockwise rotation of the support cam causes clockwise rotation of the locking cam.

2. The carriage assembly according to claim 1,
   wherein the second rail block comprises a bore hole through a center of the second rail block.

3. The carriage assembly according to claim 1, wherein the carriage assembly is coupled to a corner of the modular deck while maintaining limited movement in three degrees of freedom.

* * * * *